United States Patent
Ochi et al.

(10) Patent No.: US 7,852,395 B2
(45) Date of Patent: Dec. 14, 2010

(54) CAMERA WITH TWO IMAGE PICKUP SECTIONS

(75) Inventors: Masahito Ochi, Chiba (JP); Toshiaki Maeda, Yokohama (JP)

(73) Assignee: Nikon Corporation, Tokyo (JP)

( * ) Notice: Subject to any disclaimer, the term of this patent is extended or adjusted under 35 U.S.C. 154(b) by 512 days.

(21) Appl. No.: 11/907,083

(22) Filed: Oct. 9, 2007

(65) Prior Publication Data

US 2008/0088729 A1    Apr. 17, 2008

(30) Foreign Application Priority Data

Oct. 10, 2006   (JP)   ............... 2006-276160
Oct. 10, 2006   (JP)   ............... 2006-276179

(51) Int. Cl.
*H04N 5/222*   (2006.01)

(52) U.S. Cl. .................. 348/333.01; 396/374

(58) Field of Classification Search ............ None
See application file for complete search history.

(56) References Cited

U.S. PATENT DOCUMENTS

| | | | | |
|---|---|---|---|---|
| 5,161,025 A | * | 11/1992 | Nakao | 348/333.05 |
| 6,507,711 B2 | * | 1/2003 | Maruyama | 396/374 |
| 2001/0028482 A1 | * | 10/2001 | Nishioka | 359/15 |
| 2001/0028500 A1 | * | 10/2001 | Koyama | 359/431 |
| 2006/0274182 A1 | * | 12/2006 | Miyauchi et al. | 348/333.01 |
| 2006/0291847 A1 | * | 12/2006 | Terada | 396/257 |

FOREIGN PATENT DOCUMENTS

| | | | |
|---|---|---|---|
| JP | 61065669 A | * | 4/1986 |
| JP | A 05-145818 | | 6/1993 |
| JP | A 08-063597 | | 3/1996 |
| JP | A 2001-016573 | | 1/2001 |

* cited by examiner

*Primary Examiner*—David L Ometz
*Assistant Examiner*—Angel L Garces-Rivera
(74) *Attorney, Agent, or Firm*—Oliff & Berridge, PLC

(57) ABSTRACT

A camera includes a first image pickup section, a viewfinder optical system, a second image pickup section, a displaying section, an operation section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The displaying section provides the eyepiece section with the view confirming image. The operation section accepts from a user a displaying operation to ask for displaying of the view confirming image. The controlling section switches between a first state to provide the eyepiece section with the optical image and a second state to provide the eyepiece section with the view confirming image.

11 Claims, 17 Drawing Sheets

CAMERA WITH TWO IMAGE PICKUP SECTIONS

CROSS-REFERENCE TO RELATED APPLICATION

This application is based upon and claims the benefit of priority from Japanese Patent Application Nos. 2006-276160 and 2006-276179, both filed on Oct. 10, 2006, the entire content of which is incorporated herein by reference.

BACKGROUND

1. Field

The present invention relates to cameras having a viewfinder suitable for telescopic photographing and the like.

2. Description of the Related Art

Conventionally, in a digital camera, a photographing composition can be determined by displaying on a display device, such as an LCD monitor, an image currently being photographed. Especially, in a video camera, there is also known a camera, wherein an auxiliary photographing section that photographs a wide angle image for viewfinder display is provided independently of a recording-purpose image pickup section. In addition, Japanese Unexamined Patent Application Publication No. H05-145818 is listed as an example of the above-described camera.

Incidentally, the conventional single lens reflex camera includes a TTL (Through The Lens) optical viewfinder that observes an image of a subject with a reflected light from a movable mirror disposed on a photographing optical path.

Such an optical viewfinder can confirm the state of a subject through an optical shooting system as it is, wherein the range of field of view by the optical viewfinder substantially coincides with the field angle of the optical shooting system. For this reason, especially when the field angle of the optical shooting system is narrow as in a telescopic photographing, there is a room for improvement because a user loses sight of a moving subject and is likely to miss a photo opportunity.

Moreover, with such an optical viewfinder, the state of a subject through an optical shooting system can be confirmed as it is, however, when the field angle of the optical shooting system is narrow as in telescopic photographing, the field of view becomes extremely narrow. For this reason, a camera capable of observing a wide angle electronic image from an eyepiece section of the above-described optical viewfinder has also been studied.

However, in the camera capable of observing a wide angle electronic image from the eyepiece section of the optical viewfinder, switching the on/off of an unnecessary function is also requested in conjunction with the display state of the viewfinder. Moreover, in the above-described camera, it is sometimes more preferable that displaying of an electronic image be prohibited depending on the situations.

SUMMARY

The present invention has been made to solve at least one of the above-described problems of the prior art. It is an object of the present invention to provide a means that can confirm, without detaching eyes from an optical viewfinder, the state of field in a wider range than an optical shooting system can.

Moreover, it is another object of the present invention to provide a camera which confirms the state of field, without detaching eyes from an optical viewfinder, in a wider range than an optical shooting system does, and which performs appropriate control in response to a display state of the viewfinder or the operation condition of the camera.

A camera according to a first invention includes a first image pickup section that photographs a recording-purpose image, a viewfinder optical system, a second image pickup section, a displaying section, an operation section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The displaying section provides the eyepiece section with the view confirming image. The operation section accepts from a user a displaying operation to ask for displaying of the view confirming image. The controlling section switches, based on an operation of the operation section, between a first state to provide the eyepiece section with an optical image and a second state to provide the eyepiece section with the view confirming image.

According to a second invention, in the first invention, the controlling section, after activating the displaying section during move from the first state to the second state, instructs the second image pickup section to start photographing.

According to a third invention, in the first invention, the camera further includes a release button that accepts from a user an instruction regarding photographing. Then, the controlling section, when in the second state, stops the photographing operation of the second image pickup section after a predetermined time has elapsed since the release button was pressed.

According to a fourth invention, in the first invention, the camera further includes a release button that accepts from a user an instruction regarding photographing. Then, the controlling section, when in the second state, stops displaying of the displaying section after a predetermined time has elapsed since the release button was pressed.

According to a fifth invention, in the first invention, the camera further includes a release button that accepts from a user an instruction regarding photographing. Then, the controlling section, when in the second state, moves to the first state after a predetermined time has elapsed since the release button was pressed.

According to a sixth invention, in the first invention, the camera further includes a photograph setting section. When in the second state, the photograph setting section adjusts the photographing condition of a recording-purpose image based on an output of the second image pickup section.

According to a seventh invention, in the first invention, the camera further includes a photograph setting section. When in the second state, the photograph setting section drives the first image pickup section before photographing a recording-purpose image and adjusts the photographing condition of the recording-purpose image based on an output of the first image pickup section.

A camera according to an eighth invention includes a first image pickup section that photographs a recording-purpose image, a viewfinder optical system, a second image pickup section, a displaying section, a photograph setting section that adjusts the photographing condition of a recording-purpose image, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The displaying section provides the eyepiece section with the view confirming image. The controlling section switches between a first state to provide the eyepiece section with the optical image and a second state to provide the eyepiece section with the view confirming image, and stops the operation of the photograph setting section when in the second state.

According to a ninth invention, in the eighth invention, the camera further includes a superimposing section that displays an indication regarding the photographing condition overlappingly onto the optical image. Then, the controlling section stops displaying in the superimposing section when in the second state.

According to a tenth invention, in the eighth invention, the camera further includes an operation section that accepts from a user an operation of confirming a range of depth of field. Then, the controlling section performs confirming control of narrowing down an aperture in response to an input of the operation section, and stops the confirming control when in the second state.

A camera according to an eleventh invention includes a first image pickup section that photographs a recording-purpose image, a viewfinder optical system, a second image pickup section, a displaying section, a communication section, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The displaying section provides the eyepiece section with the view confirming image. The communication section performs communication with an external apparatus. The controlling section switches between a first state to provide the eyepiece section with the optical image and a second state to provide the eyepiece section with the view confirming image, and prohibits the second state during communication with an external apparatus.

A camera according to a twelfth invention includes a first image pickup section that photographs a recording-purpose image, a viewfinder optical system, a second image pickup section, a displaying section, a remaining amount detecting section that detects a remaining amount of a battery, and a controlling section. The viewfinder optical system has an eyepiece section that can observe an optical image of a subject with a light flux from a photographing optical path of the first image pickup section. The second image pickup section photographs a view confirming image from an optical path different from that of the first image pickup section. The displaying section provides the eyepiece section with the view confirming image. The controlling section switches between a first state to provide the eyepiece section with the optical image and a second state to provide the eyepiece section with the view confirming image, and prohibits the second state when the remaining amount of a battery is equal to or less than a threshold.

Incidentally, the camera of the present invention does not necessarily need to incorporate the image pickup section that photographs a view confirming image. For example, a camera which photographs a view confirming image using an external camera unit and provides an eyepiece section with the view confirming image received from the camera unit, or a camera system including the above-described camera and camera unit is also included in a specific embodiment of the present invention.

DETAILED DESCRIPTION OF THE EMBODIMENTS

Description of First Embodiment

Hereinafter, the structure of a single lens reflex electronic camera of a first embodiment will be described with reference to the accompanying drawings.

Figure 1:
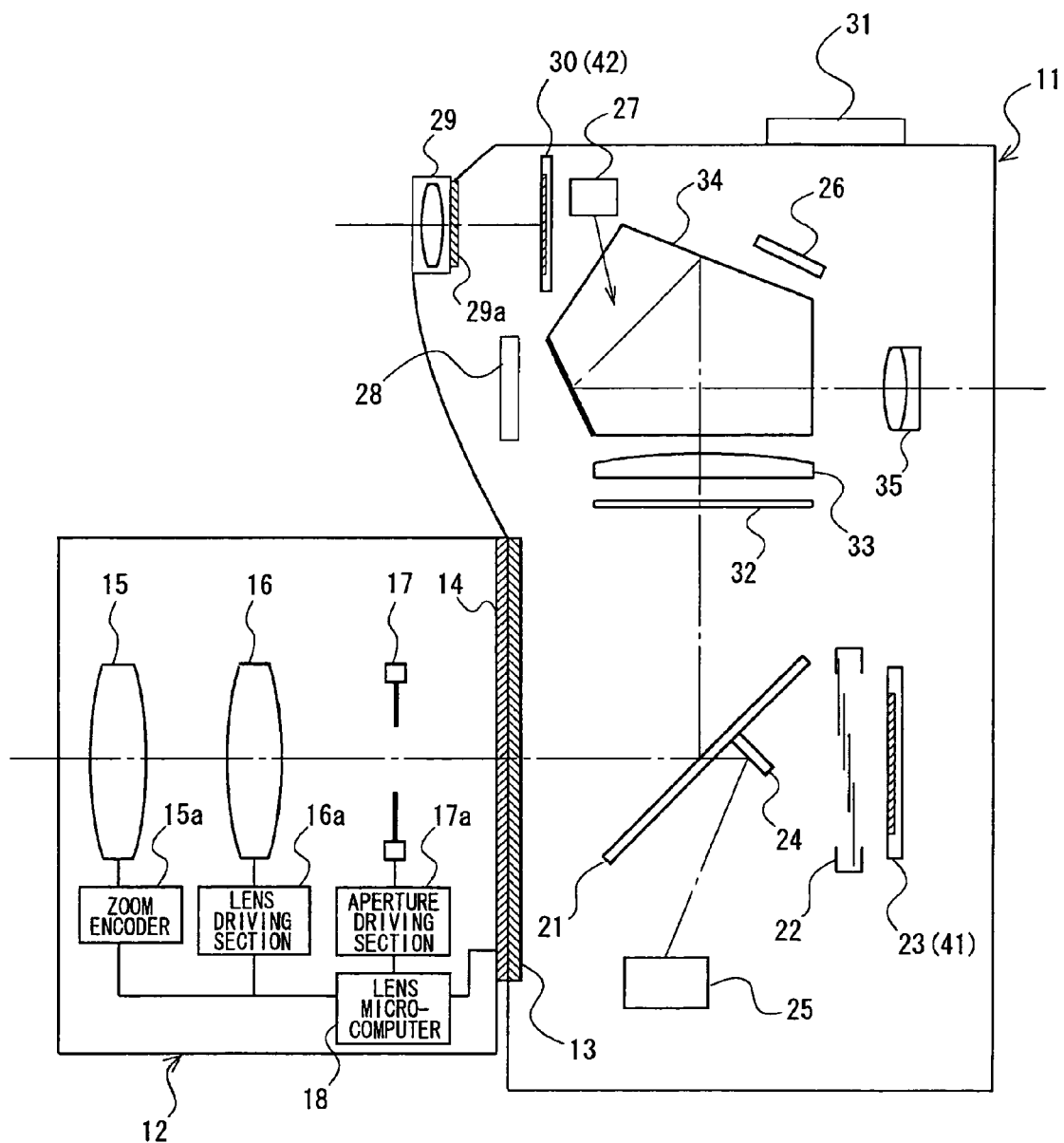
FIG. 1 is an explanatory view of a photographing mechanism of an electronic camera in a first embodiment.
Figure 2:
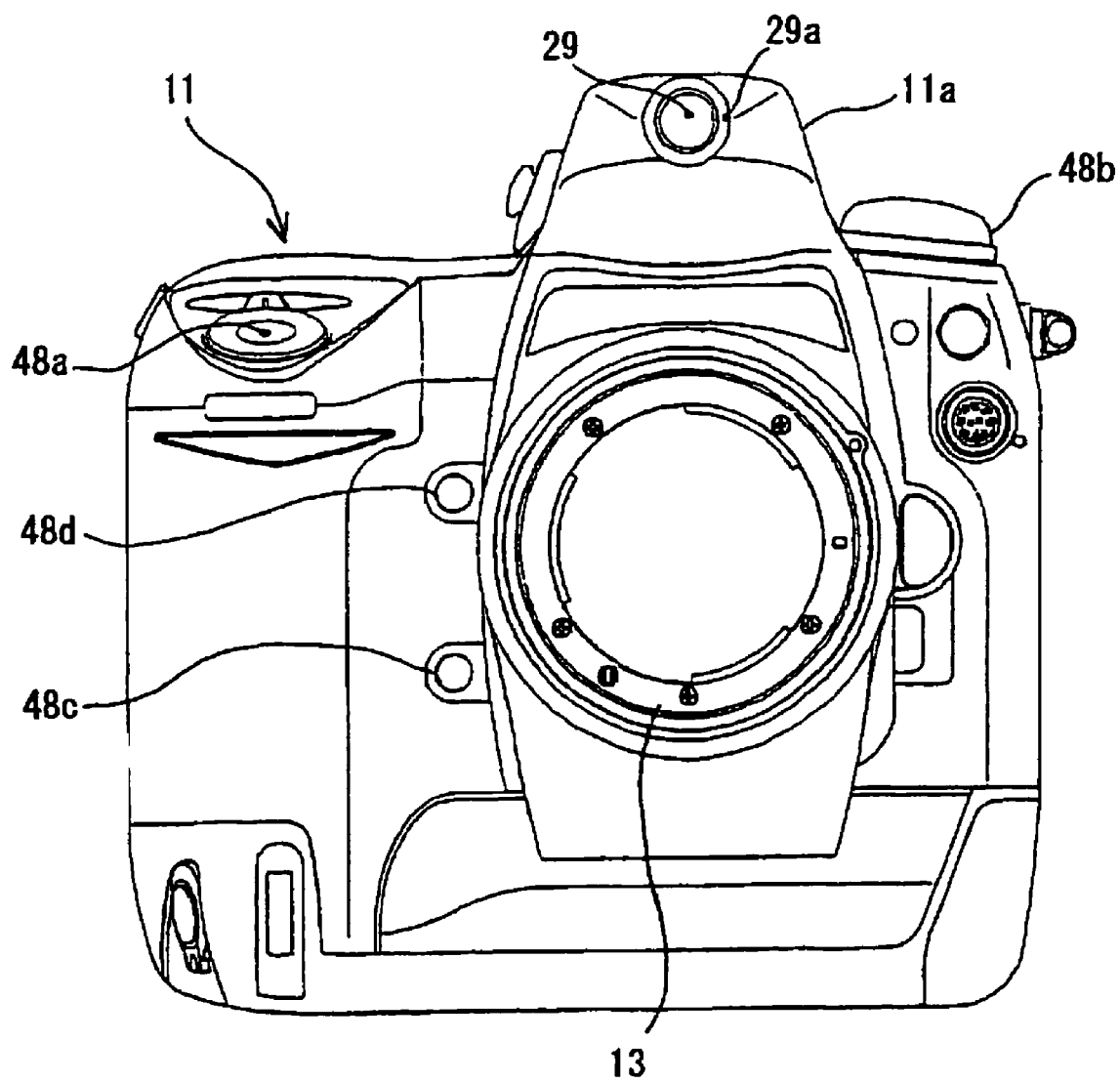
FIG. 2 is a front view of a camera body in the first embodiment.

FIG. 1 is a view illustrating a photographing mechanism of the electronic camera in the first embodiment. Moreover, FIG. 2 is a front view of a camera body in the first embodiment. The electronic camera of the first embodiment includes a camera body 11, and a lens unit 12 that houses an optical shooting system.

A pair of mounts 13, 14 serving as male and female mounts is provided in the camera body 11 and the lens unit 12, respectively. The lens side mount 14 is coupled with the camera side mount 13 by means of a bayonet mechanism or the like, whereby the lens unit 12 is interchangeably attached to the camera body 11. Moreover, electric contacts (not shown) are provided in the above-described mounts 13, 14, respectively. When the camera body 11 is connected to the lens unit 12, contact between the electric contacts results in the establishment of electrical connection between the both.

First, the structure of the lens unit 12 is described. The lens unit 12 includes a zoom lens 15, a zoom encoder 15a, a focus lens 16, a lens driving section 16a, an aperture 17, an aperture driving section 17a, and a lens microcomputer 18. In addition, the zoom encoder 15a, the lens driving section 16a, and the aperture driving section 17a are connected to the lens microcomputer 18, respectively.

The zoom lens 15 is a lens for adjusting a focal length, and is movable forward and backward in the optical axis direction in response to the operation of a zoom ring (not shown). Moreover, the zoom encoder 15a for detecting a position in the optical axis direction of the lens is attached to the zoom lens 15.

The focus lens 16 is a lens for adjusting a focus position and is movable forward and backward in the optical axis direction. The lens driving section 16a drives the focus lens 16 by a motor (not shown) and outputs a position in the optical axis direction of the focus lens 16 to the lens microcomputer 18.

The aperture 17 adjusts the amount of light incident upon the camera body 11 by opening and closing aperture blades. The aperture driving section 17a controls the opening of the aperture 17 by a motor (not shown).

The lens microcomputer 18 communicates with the camera body 11 via the electric contact of the mount 14 and carries out various controls in the lens unit 12. Moreover, the lens microcomputer 18 transmits a lens data and the like recorded on a ROM (not shown) to the camera body 11.

Incidentally, the lens unit 12 shown in FIG. 1 is just an example of the structure of a typical zoom lens unit. Thus, other than the above-described lens unit 12, for example, a lens unit without the lens microcomputer 18, a lens unit of a single focal lens, and the like can be attached to the camera body 11 of the first embodiment.

Next, the structure of the photographing mechanism of the camera body 11 is described. The camera body 11 includes a main mirror 21, a mechanical shutter 22, a first image sensor 23, a sub mirror 24, a focal point detecting section 25, a viewfinder optical system (32 to 35), a photometry section 26, a superimposing section (SI section) 27, an in-viewfinder monitor 28, an interchangeable lens 29, and a second image sensor 30.

The main mirror 21, the mechanical shutter 22, and the first image sensor 23 are disposed along the optical axis of the optical shooting system. The sub mirror 24 is disposed behind the main mirror 21. Moreover, the viewfinder optical system, the photometry section 26, the SI section 27, the in-viewfinder monitor 28, the lens 29, and the second image sensor 30 are disposed in an upper part of the camera body 11. Moreover, the focal point detecting section 25 is disposed in a lower region of the camera body 11. In addition, a hot shoe 31 for attaching a flash emission device or the like is provided in an upper part of the camera body 11.

The main mirror 21 is rotatably supported by means of a non-illustrated rotating shaft, and is switchable between an observation state and a retreated state. The main mirror 21 in the observation state is inclined and disposed in front of a mechanical shutter 22 and the first image sensor 23. The main mirror 21 in this observation state reflects a light flux passing through the optical shooting system upwards and leads the same to the viewfinder optical system. Moreover, a center part of the main mirror 21 is a half mirror. Then, a part of the light flux that is transmitted through the main mirror 21 is refracted downward by means of the sub mirror 24 and is led to the focal point detecting section 25. In addition, the focal point detecting section 25 detects an image shift amount of a subject image, the subject image being divided by a non-illustrated separator lens, for each AF area and carries out focus detection according to the so-called phase difference detecting method.

On the other hand, the main mirror 21 in the retreated state is positioned away from the photographing optical path by being flipped upward together with the sub mirror 24. When the main mirror 21 is in the retreated state, a light flux passing through the optical shooting system is led to the mechanical shutter 22 and the first image sensor 23.

The viewfinder optical system includes a diffusing screen (focal plane plate) 32, a condenser lens 33, a pentagonal prism 34, and an eyepiece lens 35. The pentagonal prism 34 among the optical elements of the viewfinder optical system is housed in a position of an overhang part 11a of the camera body 11.

The diffusing screen 32 is positioned above the main mirror 21, and a light flux reflected by the main mirror 21 in the observation state forms an image onto the diffusing screen 32 once. The light flux forming an image on the diffusing screen 32 passes through the condenser lens 33 and the pentagonal prism 34, and is led to an exit plane having an angle of 90° with respect to an incident plane of the pentagonal prism 34. Then, the light flux from the exit plane of the pentagonal prism 34 will reach a user's eye via the eyepiece lens 35. In addition, a plane opposite to the exit plane of the pentagonal prism 34 serves as a half mirror.

The photometry section 26 has a light-receiving plane in which photo detectors are disposed in two dimensions. Then, the photometry section 26 causes a part of the light flux forming an image on the diffusing screen 32 to re-form an image onto the light-receiving plane, whereby a photographing screen is divided into a plurality of portions according to a light flux passing through the optical shooting system, thus allowing photometry. In addition, the photometry section 26 is disposed in the vicinity of the pentagonal prism 34.

The SI section 27 carries out superimposing display (SI display), which superimposes the position of an AF area during photographing onto an optical image of the viewfinder optical system, by irradiating the diffusing screen 32 with an illumination light.

The in-viewfinder monitor 28 is disposed facing the half mirror plane (plane opposite to the exit plane) of the pentagonal prism 34. A view confirming image to be described below and the like are displayed on the in-viewfinder monitor 28.

The lens 29 is exposed to an exterior of the camera body 11 and is interchangeably attached to a lens fixing section 29a of the camera body 11. Moreover, the second image sensor 30 directly photographs a subject via the lens 29. The second image sensor 30 can photograph a subject from an optical path different from that in the first image sensor 23 that photographs with a light flux passing through the lens unit 12. In addition, the field angle of the lens 29 is set so as to be a wider angle than the field angle of the lens unit 12.

Moreover, the lens 29 and the second image sensor 30 of the first embodiment are housed in the overhang part 11a of the camera body 11. As shown in FIG. 2, the overhang part 11a of the camera body 11 is positioned substantially in a middle portion on the upper surface side of the camera body 11, and is formed in a shape projecting upward of the camera body 11. That is, because the positions of the lens 29 and second image sensor 30 are away from the position of the mount 13 of the camera body 11, it is less likely that the light flux from a subject is blocked by a lens-barrel of the lens unit 12 to produce shading.

Here, in the first embodiment, the following description is made assuming an example in which the lens 29 having an optical zoom function and AF function is attached to the lens fixing section 29a. In addition, because the zoom mechanism and AF mechanism in the lens 29 are basically in common with those in the lens unit 12, the duplicated description is omitted. Moreover, in FIG. 1, for simplicity of description, the lens 29 is shown as one lens.

Figure 3:
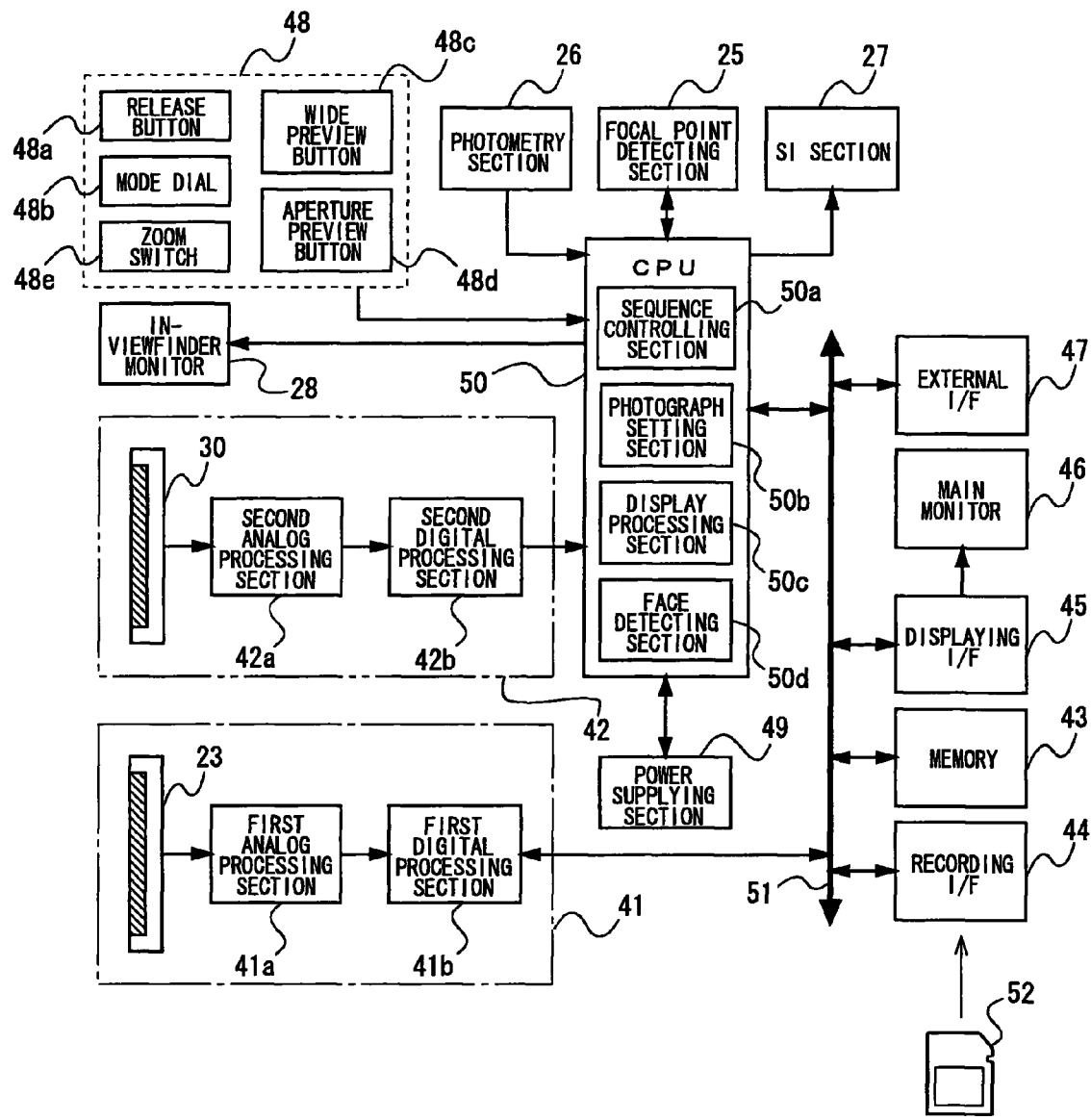
FIG. 3 is a block diagram of the camera body in the first embodiment.

Next, the circuit configuration of the electronic camera is described. FIG. 3 is a block diagram of the camera body of the first embodiment. The camera body 11 includes a first image pickup section 41, a second image pickup section 42, a memory 43, a recording I/F 44, a displaying I/F 45, a main monitor 46, an external I/F 47, an operation section 48, a power supplying section 49, and a CPU 50, and a system BUS 51, in addition to the focal point detecting section 25, the photometry section 26, the SI section 27, and the in-viewfinder monitor 28. Here, the first image pickup section 41, the memory 43, the recording I/F 44, the displaying I/F 45, the external I/F 47, and the CPU 50 are connected to one another via the system BUS 51. In addition, the CPU 50 is also connected to an electric contact of the mount 13 and an electric contact of the hot shoe 31 (illustrations thereof are omitted in FIG. 3).

The first image pickup section 41 includes the first image sensor 23, a first analog processing section 41a, and a first digital processing section 41b.

The first image sensor 23 is a sensor for generating an intended image that is a recording-purpose image. The first image sensor 23 photoelectrically converts a light flux passing through the lens unit 12 during release period and outputs an analog image signal of the intended image. An output signal of the first image sensor 23 is input to the first analog processing section 41a. In addition, the first image sensor 23 can also output a through image by pixel skipping and reading at predetermined intervals during standby for photographing (during non-release period). Thus, when the main mirror 21 is in the retreated position, the CPU 50 can also determine a photographing condition based on the through image of the first image sensor 23.

The first analog processing section 41a is an analog front end circuit that includes a CDS circuit, a gain circuit, an analog-to-digital conversion circuit, and the like. The CDS circuit reduces the noise component of an output of the first image sensor 23 by correlation double sampling. The gain circuit outputs an input signal by amplifying the input signal. This gain circuit can adjust the image pickup sensitivity that is equivalent to ISO sensitivity. The analog-to-digital conversion circuit analog-to-digital converts an output signal of the first image sensor 23. In addition, in FIG. 3, the illustration of the respective circuits of the first analog processing section 41a is omitted.

The first digital processing section 41b carries out various kinds of image processings (defective pixel correction, color interpolation processing, gray scale conversion processing, white balance adjustment, edge enhancement, and the like) to the output signal of the first analog processing section 41a to generate a data of the intended image. Moreover, the first digital processing section 41b carries out compression and expansion processing and the like of the data of the intended image. The first digital processing section 41b is connected to the system BUS 51.

The second image pickup section 42 includes the second image sensor 30, a second analog processing section 42a, and a second digital processing section 42b. In addition, because the configuration of the second image pickup section 42 substantially corresponds to the configuration of the first image pickup section 41, a part of the description regarding the duplicated portion between the both is omitted.

The second image sensor 30 photographs a view confirming image used for the viewfinder. The second image sensor 30 photoelectrically converts a subject image formed passing through the lens 29, at predetermined intervals and outputs a through image (view confirming image). An output signal of the second image sensor 30 is input to the second analog processing section 42a.

The second analog processing section 42a is an analog front end circuit that includes a CDS circuit, a gain circuit, an analog-to-digital conversion circuit, and the like. The second digital processing section 42b carries out color interpolation processing and the like of the through image. In addition, a data of the through image output from the second digital processing section 42b is input to the CPU 50.

The memory 43 is a buffer memory for temporarily recording the data of an intended image in a preceding step, a subsequent step, or the like of the image processing by the first digital processing section 41b.

A connector for connecting a recording medium 52 is formed in the recording I/F 44. Then, the recording I/F 44 carries out writing/reading of a photographic image data to/from the recording medium 52 connected to the connector. The above-described recording medium 52 is made of a hard disk, a memory card containing a semiconductor memory, and the like. In addition, FIG. 3 illustrates a memory card as an example of the recording medium 52.

The displaying I/F 45 controls the display of the main monitor 46 based on an instruction from the CPU 50. The main monitor 46 is disposed at the back part of the camera body 11 and the like, for example. The main monitor 46 displays various kinds of images in response to instructions from the CPU 50 and displaying I/F 45. For example, the main monitor 46 can display the reproduced image of an intended image, a menu screen capable of receiving GUI (Graphical User Interface) type inputs, and the like (illustration of each of the above-described images is omitted).

The external I/F 47 includes connection terminals compliant with a serial communications standard, such as USB (Universal Serial Bus). Then, the external I/F 47 controls data transmission and reception with a computer connected via the connection terminal, according to the above-described telecommunications standard.

The operation section 48 includes a plurality of switches for accepting the operations of a user. For example, the operation section 48 includes a release button 48a, a mode dial 48b, a wide preview button 48c, an aperture preview button 48d, and a zoom switch 48e.

The release button 48a accepts an instruction input for starting an AF operation before photographing and an instruction input for starting an exposure operation during photographing, from a user. The mode dial 48b accepts an input for switching the photographing modes, from a user. The wide preview button 48c accepts from a user an operation for switching between the viewfinder display of an optical image by means of the viewfinder optical system and the display of a view confirming image (wide preview display) by means of the in-viewfinder monitor 28. The aperture preview button

48d accepts from a user a confirming input for confirming the range of depth of field. If there is this confirming input, the aperture 17 is squeezed down and a user can confirm the range of depth of field by means of the viewfinder optical system. The zoom switch 48e accepts from a user an operation for optically or electronically increasing/decreasing the magnifying power of the view confirming image.

The power supplying section 49 supplies the electric power of a non-illustrated battery to each part of the camera body 11. Moreover, the power supplying section 49 detects the remaining amount of battery based on the battery voltage.

The CPU 50 carries out an overall control of each part of the electronic camera. Moreover, the CPU 50 functions as a sequence control section 50a, a photograph setting section 50b, a display processing section 50c, and a face detecting section 50d, by means of programs stored in a non-illustrated ROM.

The sequence control section 50a carries out operation control and the like of the lens unit 12, the main mirror 21, the mechanical shutter 22, the first image pickup section 41, the second image pickup section 42, and the like. Moreover, the sequence control section 50a carries out control for switching between the finder display by means of the viewfinder optical system and the wide preview display, in response to the operation of the wide preview button 48c. In addition, the sequence control section 50a functions also as an emission control section that carries out emission control of an external flash emission device (not shown).

The photograph setting section 50b carries out an automatic exposure (AE) calculation, an auto white balance (AWB) calculation, and the like, while carrying out autofocus (AF), and determines various kinds of parameters (exposure time, aperture value, image pickup sensitivity, and the like) of the photographing condition of the first image pickup section 41. Moreover, the photograph setting section 50b is also responsible for processings regarding AF, AE, and AWB of the second image pickup section 42.

More specifically, the photograph setting section 50b calculates a defocusing amount (deviation amount from a focus position and the direction thereof) of the focus lens 16 for each AF area based on an image phase difference amount in the focal point detecting section 25. Moreover, the photograph setting section 50b carries out the AE calculation and AWB calculation based on an output of the photometry section 26. In addition, the photograph setting section 50b can also carry out each calculation of the AF, AE, and AWB based on the data of a through image of the first image sensor 23 or the second image sensor 30.

The display processing section 50c performs various kinds of image processings on the data of the through image of the second image pickup section 42. In addition, a view confirming image output from the display processing section 50c is displayed on the in-viewfinder monitor 28.

The face detecting section 50d performs the well-known face detection processing on the data of the through image of the second image pickup section 42, and detects the face area of a subject contained in the view confirming image. For example, the face detecting section 50d extracts the face area by an extraction processing of the characteristic points of a face described in Japanese Unexamined Patent Application Publication No. 2001-16573 and the like. The above-described characteristic points include each end point of the eyebrow, eye, nose, and lip, a contour point of the face, a vertex of the head, a lower end point of the jaw, and the like, for example. Or, as in Japanese Unexamined Patent Application Publication No. Hei-8-63597, the face detecting section 50d may extract the contour of a skin-colored region based on color information on a subject, and detect the face by further performing the matching with the template of a face component that is prepared in advance.

Figure 4:
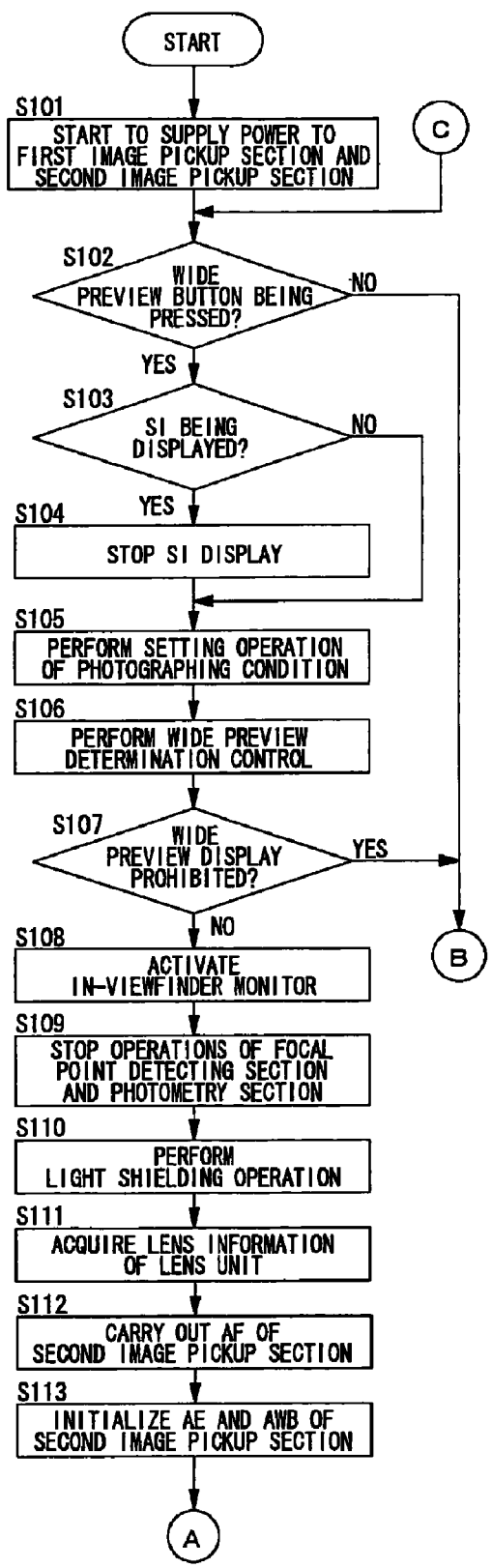
FIG. 4 is a flow chart showing an operation of the electronic camera regarding a wide preview display in the first embodiment.
Figure 5:
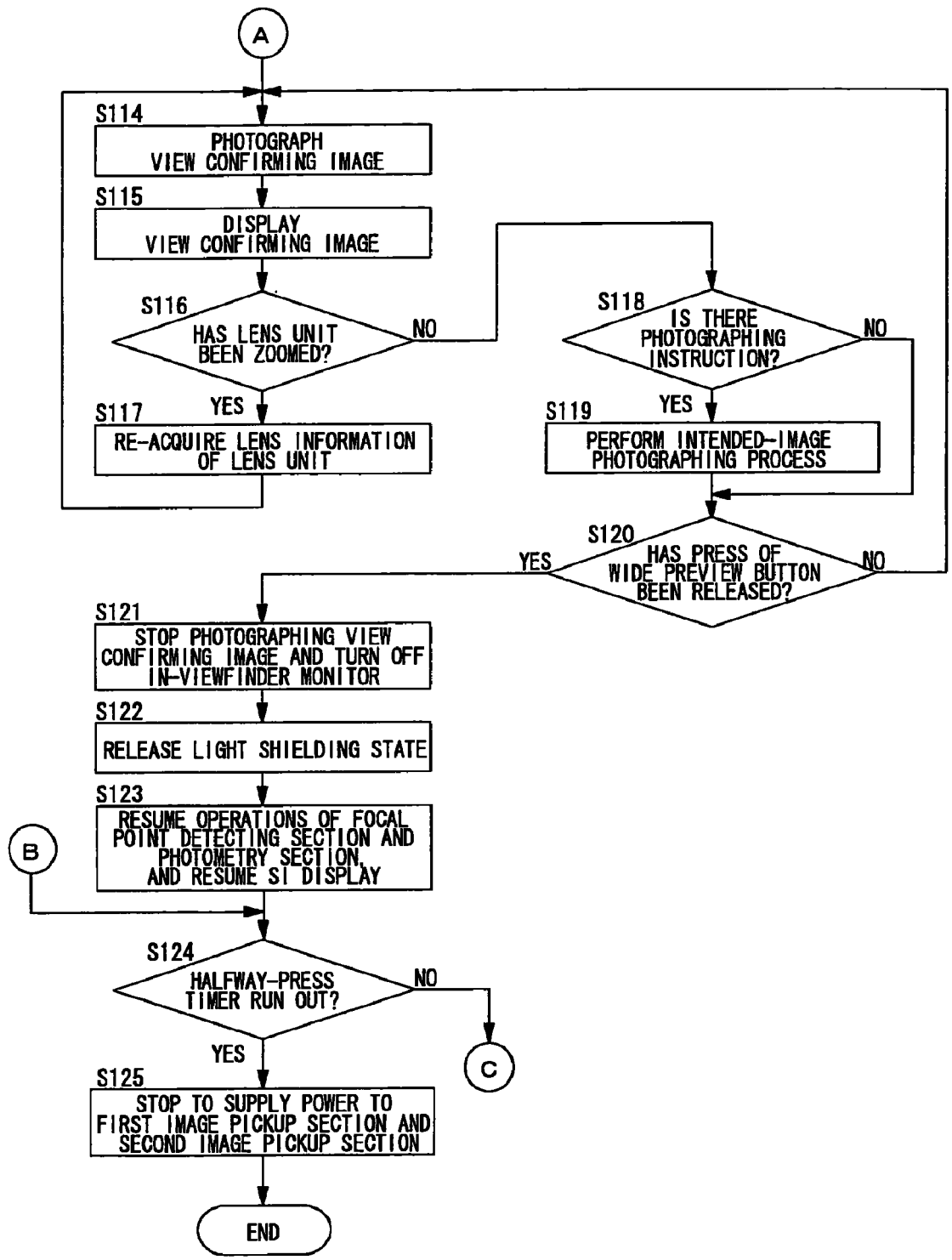
FIG. 5 is a flow chart showing an operation of the electronic camera regarding the wide preview display in the first embodiment.

Hereinafter, the operation of the electronic camera regarding the wide preview display in the first embodiment will be described with reference to flow charts of FIG. 4 and FIG. 5.

Step 101: upon receipt of halfway-press input of the release button 48a from a user while the camera body 11 is powered on, the CPU 50 will move from a power saving state to a photographing preparation state. Specifically, the CPU 50 activates a sequential program used for photographing and supplies power to each circuit and the like of the first image pickup section 41 and second image pickup section 42.

Figure 6:
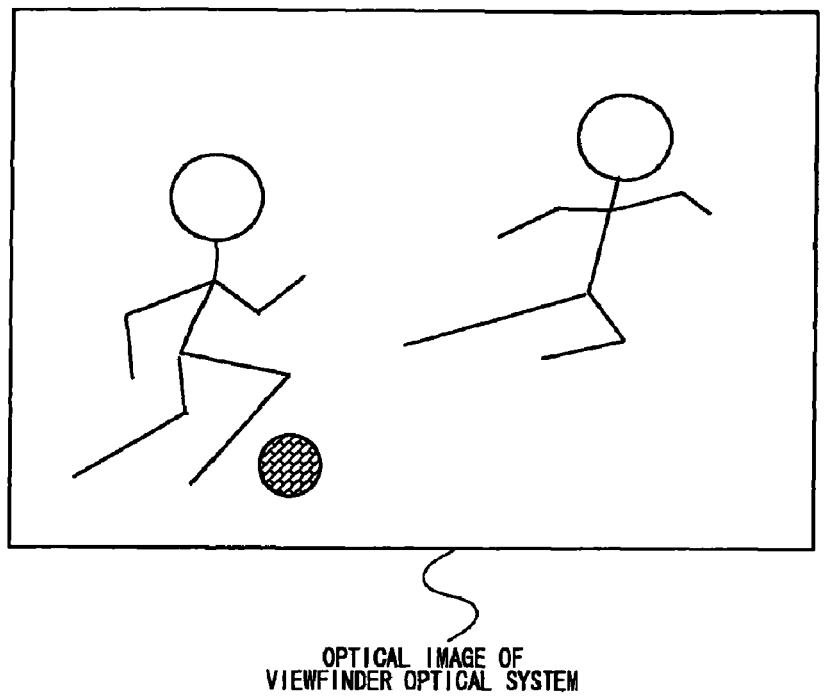
FIG. 6 is a view showing a display state of an optical image of a subject in a viewfinder optical system.

At the stage of S101, the main mirror 21 is in the observation position. Accordingly, a user can observe from the eyepiece lens 35 a subject image formed by a light flux that passed through the lens unit 12. In addition, FIG. 6 shows a display state of an optical image of a subject in the viewfinder optical system.

Step 102: the CPU 50 determines whether or not the wide preview button 48c is being pressed. If the wide preview button 48c is being pressed (YES side), the flow moves to S103. On the other hand, if the wide preview button 48c is not being pressed (NO side), the flow moves to S124.

Step 103: the CPU 50 determines whether or not the SI section 27 is performing SI display of an AF area while the wide preview button 48c is pressed. When the SI display is being performed (YES side), the flow moves to S104. On the other hand, if the SI display is not being performed (NO side), the flow moves to S105.

Step 104: the CPU 50 instructs the SI section 27 to stop the SI display. This is because an optical image by means of the viewfinder optical system is not displayed in the wide preview display and thus the SI display is not required.

Step 105: the CPU 50 performs a setting operation of the photographing condition. Specifically, the CPU 50 performs AF based on an output of the focal point detecting section 25. Moreover, the CPU 50 performs the AE calculation and AWB calculation based on an output of the photometry section 26. In addition, in S105, the SI display of an AF area by the Si section 27 is not performed.

Step 106: the CPU 50 performs a wide preview determination control to determine whether or not it is the case where the wide preview display is prohibited.

Specifically, if the case corresponds to either one of the following conditions: (1) when light emission by the flash-emission device is carried out during photographing and (2) when the brightness of field is equal to or less than a threshold, then the CPU 50 turns on the flag for prohibiting the wide preview display.

Step 107: the CPU 50 determines whether or not the flag for prohibiting the wide preview display has been turned on in the wide preview determining control (S106). If the wide preview display is prohibited (YES side), the flow moves to S124. On the other hand, if the wide preview display is allowed (NO side), the flow moves to S108.

Step 108: before starting photographing by means of the second image sensor 30, the CPU 50 starts to supply power to the in-viewfinder monitor 28, thus activating the in-viewfinder monitor 28 in advance.

Step 109: the CPU 50 stops the operations of the focal point detecting section 25 and photometry section 26 prior to starting the wide preview display. This is because the focal point detecting section 25 and the photometry section 26 will be unable to function by the below-described light shielding operation during wide preview display.

Step 110: the CPU 50 performs the light shielding operation to block the incident light from the lens unit 12 onto the viewfinder optical system.

Specifically, the CPU 50 moves the main mirror 21 from the observation position to the retreated position to block the incident light onto the viewfinder optical system. In addition, if the brightness of field is sufficiently low, the CPU 50 may block the incident light onto the viewfinder optical system by narrowing down the aperture 17.

Step 111: the CPU 50 acquires the lens information (the lens positions and the like of the zoom lens 15 and focus lens 16) from the lens unit 12.

Step 112: the CPU 50 performs AF of the lens 29 based on the lens position of the focus lens 16 among the lens information in S111. In addition, if the lens 29 is of a pan-focus type and does not have the AF function, the step of S111 is omitted.

Step 113: the CPU 50 initializes the AE and AWB of the second image pickup section 42 based on the photographing condition acquired in S105. In addition, after the start of photographing in the second image pickup section 42, the CPU 50 adjusts the parameters of the AE and AWB of the second image pickup section 42 based on the data of a through image in the second image pickup section 42.

Step 114: the CPU 50 photographs a view confirming image by means of the second image sensor 30 of the second image pickup section 42. Then, the second image pickup section 42 outputs data of the view confirming image to the CPU 50.

Figure 7:
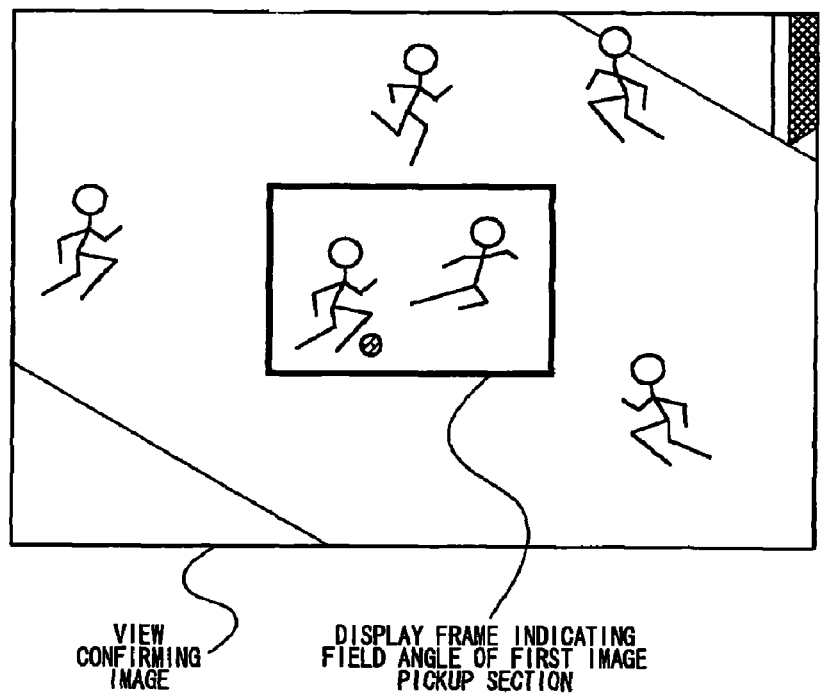
FIG. 7 is a view showing an example of a view confirming image in the wide preview display.

Step 115: the display processing section 50c of the CPU 50 displays the view confirming image (S114) on the in-viewfinder monitor 28. Since the field angle of the lens 29 has a wider angle than the field angle of the lens unit 12 has, the view confirming image can display a subject in a wider range than an optical image of the viewfinder optical system can. Moreover, FIG. 7 shows an example of display of the view confirming image corresponding to the scene of FIG. 6.

Figure 8:
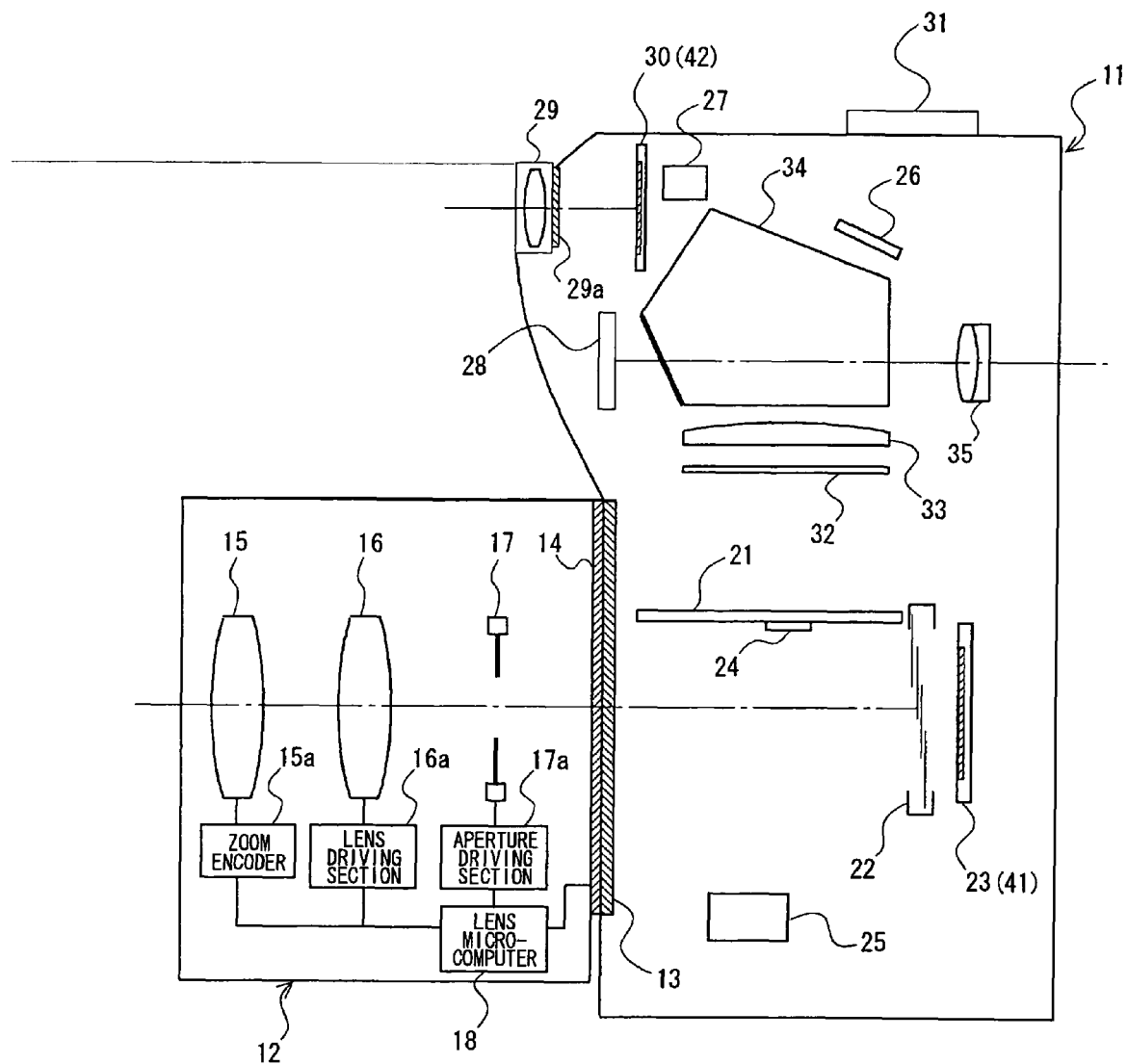
FIG. 8 is a view showing a state of the camera body during wide preview display.

Here, FIG. 8 shows a state of the camera body 11 during wide preview display. Since the incident light from the lens unit 12 onto the viewfinder optical system is blocked by the light shielding operation (S110) during wide preview display, a user can observe only the view confirming image (S114) of the in-viewfinder monitor 28 from the eyepiece lens 35. Accordingly, a user can observe a field by means of a wider-angled view confirming image than an image of the viewfinder optical system without detaching eyes away from the eyepiece lens 35. In addition, FIG. 8 shows an example of the light shielding state in which the main mirror 21 is moved to the retreated position during the light shielding operation.

Moreover, the display processing section 50c performs display processing for indicating the range of field angle of the first image pickup section 41 on the view confirming image. For example, the display processing section 50c calculates the range of field angle of the first image pickup section 41 in a view confirming image based on the lens information (S111) and the zoom position data of the lens 29. Then, the display processing section 50c displays a frame indicative of the above-described range of field angle overlappingly onto a view confirming image in the in-viewfinder monitor 28 by means of an on-screen function (see FIG. 7). In this case, a user can also know the photographing area of the first image pickup section 41 from the view confirming image.

In addition, the CPU 50 in S115 can carry out the zooming of the lens 29 or the electronic zooming of a view confirming image by the display processing section 50c, in response to a user's operation of the zoom switch 48e.

Step 116: the CPU 50 determines whether or not there is a change in the lens position of the zoom lens 15 of the lens unit 12 (whether the lens unit 12 has been zoomed). If there is a change in the lens position due to the zooming of the lens unit 12 (YES side), the flow moves to S117. On the other hand, if there is no change in the lens position (NO side), the flow moves to S118.

Step 117: the CPU 50 re-acquires the lens information regarding the lens position of the zoom lens 15 from the lens unit 12. Then, the CPU 50 returns to S114 and repeats the above-described operations. In this way, in the display processing in S115, the display processing section 50c can display a frame that reflects a change in the field angle due to the zooming of the zoom lens 15.

Step 118: the CPU 50 determines whether or not there is a photographing instruction given by a press of the release button 48a. If there is the photographing instruction (YES side), the flow moves to S119. On the other hand, if there is no photographing instruction (NO side), the flow moves to S120.

Step 119: the CPU 50 performs an intended-image photographing process, and photographs an intended image by means of the first image sensor 23 of the first image pickup section 41. Subsequently, the first image pickup section 41 generates an image data of the intended image, and the CPU 50 records the image data of the intended image onto the recording medium 52.

Here, in the intended-image photographing process of S119, the CPU 50 once releases the shielding state caused by the wide preview display and light shielding operation, and operates the focal point detecting section 25 and photometry section 26 to re-set the photographing condition before photographing. Then, the CPU 50 photographs the intended image based on the photographing condition that is re-set immediately before photographing. In this case, the CPU 50 resumes the wide preview display after completion of the photographing.

In addition, the CPU 50 may photograph the intended image based on the photographing condition of S105 without releasing the state of light shielding operation. In this case, a subject can be photographed more quickly because the operation of re-setting the photographing condition can be omitted.

Step 120: the CPU 50 determines whether or not the pressing of the wide preview button 48c has been released. If the pressing of the wide preview button 48c has been released (YES side), the flow moves to S121. On the other hand, if the wide preview button 48c is being pressed (NO side), the flow returns to the operation of S114.

Step 121: on the other hand, if the pressing of the wide preview button 48c has been released, the CPU 50 stops photographing the view confirming image in the second image pickup section 42 and turns off the in-viewfinder monitor 28.

Step 122: the CPU 50 releases the light shielding state caused by the light shielding operation. Accordingly, a user can observe again the subject image from the eyepiece lens 35, the object image being formed by a light flux that passed through the lens unit 12.

Step 123: the CPU 50 resumes the operations of the focal point detecting section 25 and photometry section 26. Moreover, the CPU 50 instructs the SI section 27 to resume the SI display.

Step 124: the CPU 50 determines whether or not a predetermined time has elapsed since the release button 48a was halfway-pressed (whether a halfway-press timer has run out). If the halfway-press timer has run out (YES side), the flow moves to S125. On the other hand, if the halfway-press timer has not run out (NO side), the CPU 50 returns to S102 and repeats the above-described operations.

Step 125: the CPU 50 stops to supply power to each circuit of the first image pickup section 41 and second image pickup section 42 and returns to the power saving state to complete the photographing operation. Now, the description of the operations according to the flow charts of FIG. 4 and FIG. 5 has been completed.

Hereinafter, an effect of the first embodiment is described. The electronic camera of the first embodiment photographs a view confirming image from an optical path different from that of the first image pickup section 41 by means of the second image pickup section 42 in response to an operation of the wide preview button 48c. Then, the electronic camera displays the view confirming image observably from the eyepiece lens 35 by means of the in-viewfinder monitor 28. Thus, a user can selectively observe an optical image by means of the viewfinder optical system and a view confirming image by means of the second image pickup section 42 depending on the situations without detaching eyes away from the eyepiece lens 35.

Especially when a telescopic lens with a narrow field angle is mounted on the camera body 11, the field of view of an optical image by means of the viewfinder optical system becomes narrow, however, even in this case a user can appropriately know the state of field by the wide-angle view confirming image. Accordingly, even in the case where a moving subject is telescopically photographed, e.g., in photographing sports and the like, a user can track the subject relatively easily, so that the user is less likely to miss a photo opportunity.

Moreover, the CPU 50 in the first embodiment activates the in-viewfinder monitor 28 in advance before starting photographing by means of the second image sensor 30 (S108). Thus, the display start of the view confirming image will not be delayed a lot by the activation time of the in-viewfinder monitor 28, so that the responsiveness of the electronic camera in carrying out the viewfinder display can be improved significantly.

Furthermore, the CPU 50 in the first embodiment stops photographing in the second image pickup section 42 and turns off the in-viewfinder monitor 28 when the halfway-press timer has run out. Moreover, by stopping or controlling the supply of power to the image sensor, the power consumption while the halfway-press timer is run out (in the power saving state) can be reduced and the number of frames photographed with one-time battery charging can be increased.

Description of Second Embodiment

Figure 9:
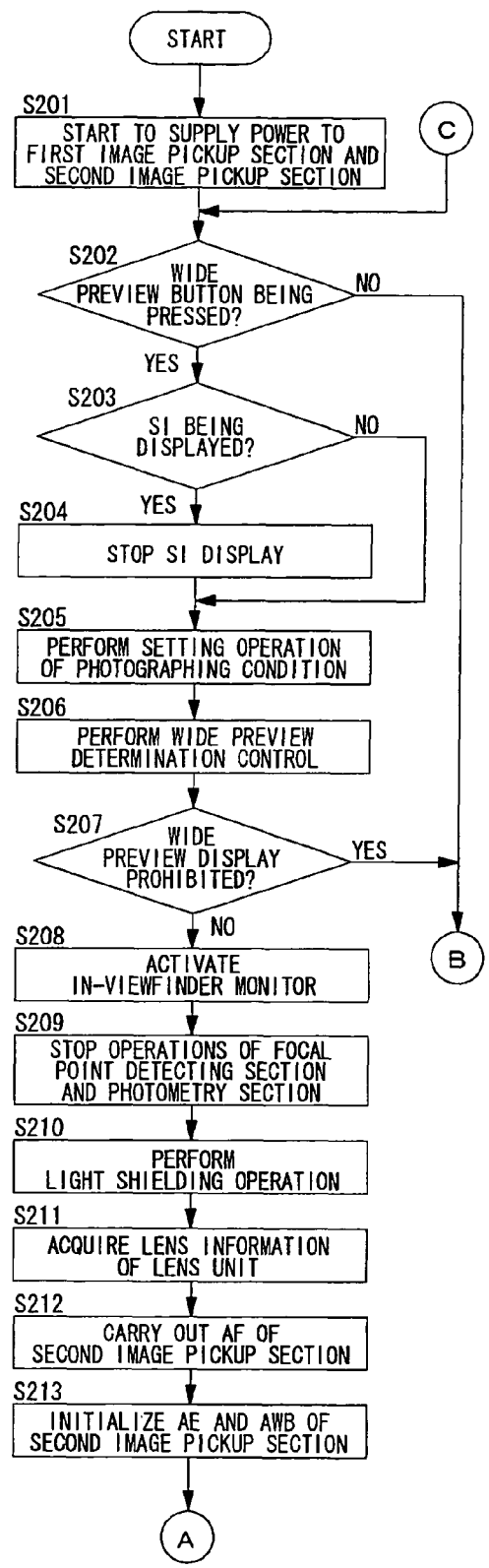
FIG. 9 is a flow chart showing an operation of an electronic camera regarding wide preview display in a second embodiment.
Figure 10:
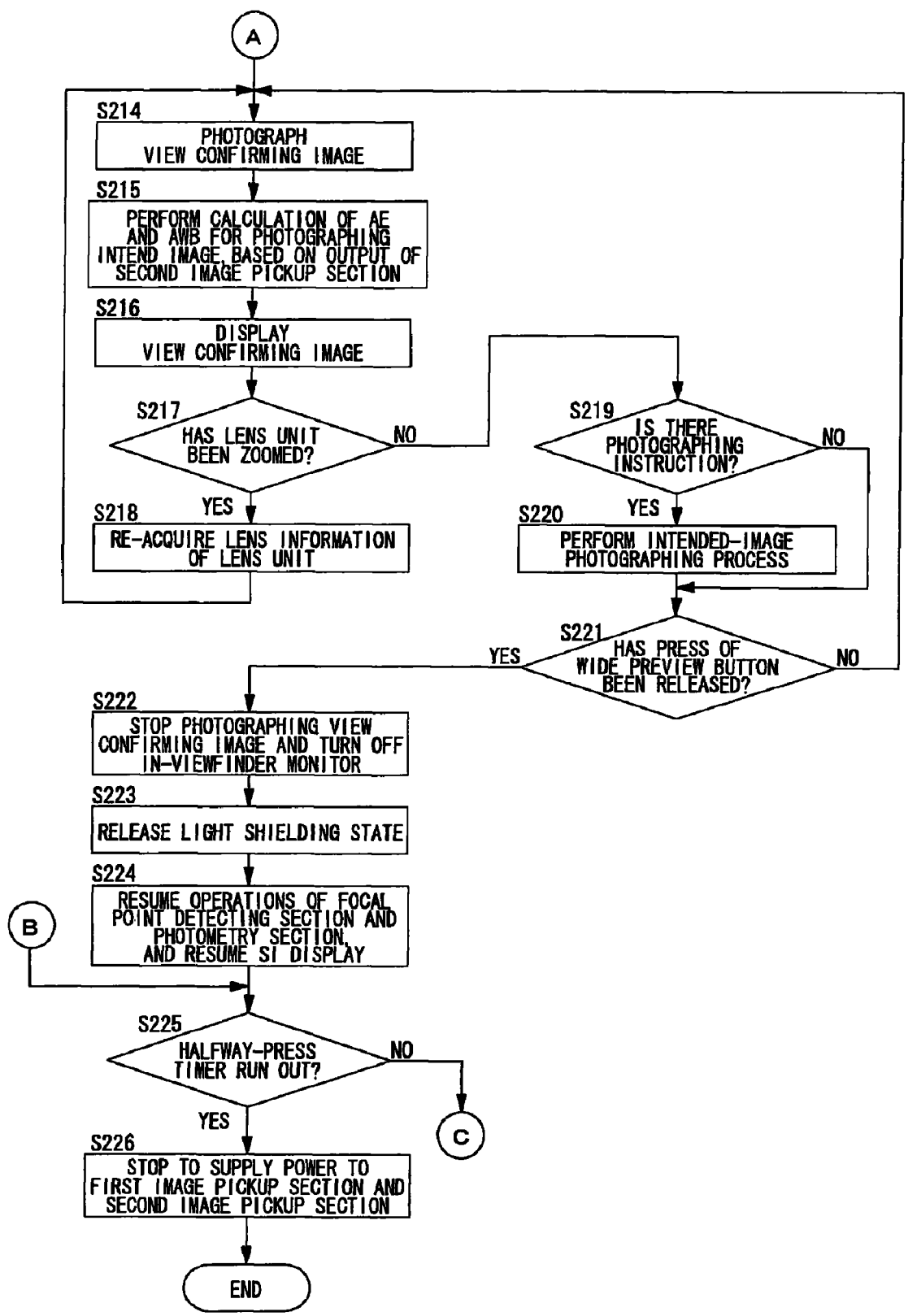
FIG. 10 is a flow chart showing an operation of the electronic camera regarding the wide preview display in the second embodiment.

FIG. 9 and FIG. 10 are flow charts showing an operation of an electronic camera regarding a wide preview display in a second embodiment. Here, since the basic configuration of the electronic camera of the second embodiment is in common with that of the first embodiment, the duplicated description is omitted. Moreover, S201 to S214 shown in FIG. 9 and FIG. 10 correspond to S101 to S114 of the first embodiment, respectively. S221 to S226 also correspond to S120 to S125 of the first embodiment, respectively. Accordingly, in the description of the second embodiment, only steps different from those in the case of the first embodiment will be described, and the operational description of the substantially duplicated steps is omitted.

Step 215: the photograph setting section 50b of the CPU 50 carries out the calculation of the AE and AWB for photographing an intended image, based on the data of a through image in the second image pickup section 42.

Step 216: the display processing section 50c of the CPU 50 displays the view confirming image (S214) on the in-viewfinder monitor 28. In addition, this step corresponds to the above-described S115.

Step 217: the CPU 50 determines whether or not there is a change in the lens position of the zoom lens 15 of the lens unit 12 (whether the lens unit 12 has been zoomed). If there is a change in the lens position due to the zooming of the lens unit 12 (YES side), the flow moves to S218. On the other hand, if there is no change in the lens position (NO side), the flow moves to S219.

Step 218: the CPU 50 re-acquires the lens information regarding the lens position of the zoom lens 15 from the lens unit 12. Then, the CPU 50 returns to S214 and repeats the above-described operations. In addition, this step corresponds to the above-described S117.

Step 219: the CPU 50 determines whether or not there is a photographing instruction given by a press of the release button 48a. If there is the photographing instruction (YES side), the flow moves to S220. On the other hand, if there is no photographing instruction (NO side), the flow moves to S221.

Step 220: the CPU 50 performs the intended-image photographing process, and photographs an intended image by means of the first image sensor 23 of the first image pickup section 41. Subsequently, the first image pickup section 41 generates an image data of the intended image, and the CPU 50 records the image data of the intended image onto the recording medium 52.

Here, in the intended-image photographing process of S220, the CPU 50 carries out photographing of the intended image based on the calculation result of AE and AWB of S215. In this case, the CPU 50 can photograph the intended image by means of the first image pickup section 41 while continuing the wide preview display.

Hereinafter, an effect of the second embodiment is described. In the electronic camera of the second embodiment, substantially the same effect as that of the first embodiment can be obtained. Moreover, in the second embodiment, the CPU 50 carries out the calculation of the AE and AWB for photographing an intended image, based on an output of the second image pickup section 42 (S215). For this reason, a relatively clear intended image can be obtained also in photographing an intended image without releasing the light shielding state during wide preview display.

Description of Third Embodiment

Figure 11:
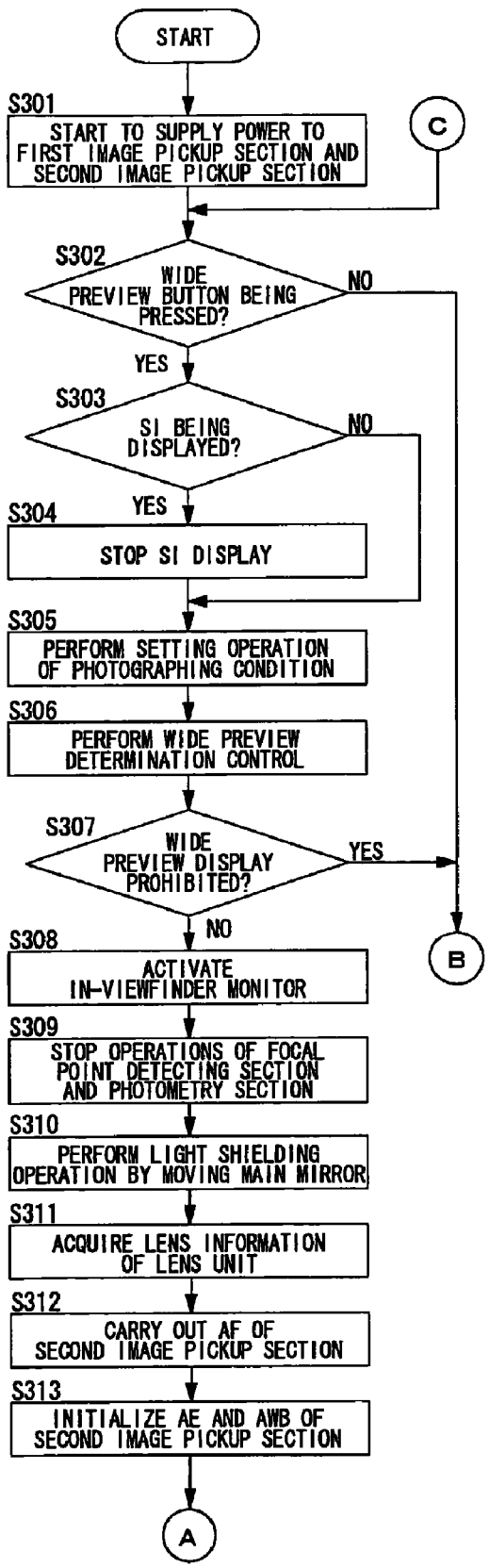
FIG. 11 is a flow chart showing an operation of an electronic camera regarding a wide preview display in a third embodiment.
Figure 12:
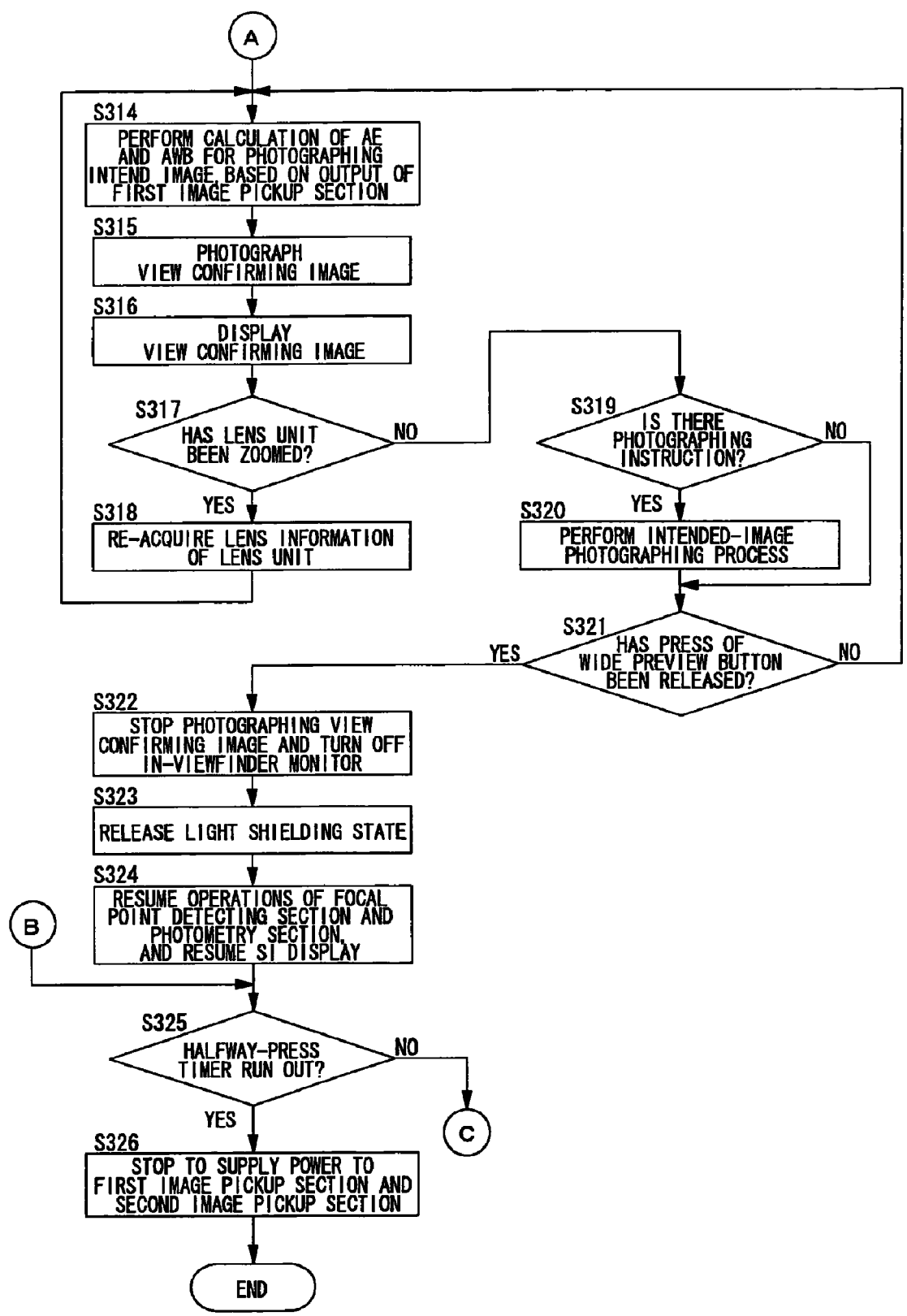
FIG. 12 is a flow chart showing an operation of the electronic camera regarding the wide preview display in the third embodiment.

FIG. 11 and FIG. 12 are flow charts showing an operation of an electronic camera regarding the wide preview display in a third embodiment. Here, since the basic configuration of the electronic camera of the third embodiment is in common with that of the first embodiment, the duplicated description is omitted. Moreover, S301 to S309 shown in FIG. 11 and FIG. 12 correspond to S101 to S109 of the first embodiment, respectively. S321 to S326 also correspond to S120 to S125 of the first embodiment, respectively. Accordingly, in the description of the third embodiment, only steps different from those in the case of the first embodiment will be described, and the operational description of the substantially duplicated steps is omitted.

Step 310: the CPU 50 moves the main mirror 21 from the observation position to the retreated position to block the incident light from the lens unit 12 onto the viewfinder optical system (light shielding operation). In addition, the CPU 50 in the third embodiment will not perform the light shielding operation by means of the aperture 17.

Step 311: the CPU 50 acquires the lens information (the lens positions and the like of the zoom lens 15 and focus lens 16) from the lens unit 12.

Step 312: the CPU 50 carries out the AF of the lens 29 based on the lens position of the focus lens 16 among the lens information in S311. In addition, this step corresponds to the above-described S112.

Step 313: the CPU 50 initializes the AE and AWB of the second image pickup section 42 based on the photographing condition acquired in S305. In addition, this step corresponds to the above-described S113.

Step 314: the CPU 50 photographs a through image by driving the first image sensor 23. Then, the photograph setting section 50b of the CPU 50 sets the photographing condition of the intended image based on the data of the through image in the first image pickup section 41.

Here, the photograph setting section 50b carries out the well-known AF by a contrast detection method based on the data of the above-described through image. For example, the photograph setting section 50b performs continuous AF that repeats focusing with the use of the output of the first image pickup section 41 during photographing and at the same time makes an AF lock by halfway pressing the release button. Moreover, the photograph setting section 50b carries out the AE calculation and AWB calculation for the intended image based on the data of a through image in the first image pickup section 41.

Step 315: the CPU 50 photographs a view confirming image with the second image sensor 30 of the second image pickup section 42. Then, the second image pickup section 42 outputs a data of the view confirming image to the CPU 50.

Step 316: the display processing section 50c of the CPU 50 displays the view confirming image on the in-viewfinder monitor 28 (S315). In addition, this step corresponds to the above-described S115.

Step 317: the CPU 50 determines whether or not there is a change in the lens position of the zoom lens 15 of the lens unit 12 (whether the lens unit 12 has been zoomed). If there is a change in the lens position due to the zooming of the lens unit 12 (YES side), the flow moves to S318. On the other hand, if there is no change in the lens position (NO side), the flow moves to S319.

Step 318: the CPU 50 re-acquires the lens information regarding the lens position of the zoom lens 15 from the lens unit 12. Then, the CPU 50 returns to S314 and repeats the above-described operations. In addition, this step corresponds to the above-described S117.

Step 319: the CPU 50 determines whether or not there is a photographing instruction given by a press of the release button 48a. If there is the photographing instruction (YES side), the flow moves to S320. On the other hand, if there is no photographing instruction (NO side), the flow moves to S321.

Step 320: the CPU 50 performs the intended-image photographing process, and photographs an intended image by means of the first image sensor 23 of the first image pickup section 41. Subsequently, the first image pickup section 41 generates an image data of the intended image, and the CPU 50 records the image data of the intended image onto the recording medium 52.

Here, in the intended-image photographing process of S320, the CPU 50 carries out photographing of the intended image based on the photographing condition of S314. In this case, the CPU 50 can photograph the intended image by means of the first image pickup section 41 while continuing the wide preview display.

Hereinafter, an effect of the third embodiment is described. In the electronic camera of the third embodiment, substantially the same effect as that of the first embodiment can be obtained. Moreover, in the electronic camera of the third embodiment, the photographing condition can be set based on a through image in the first image pickup section 42 (S314). For this reason, a relatively clear intended image can be obtained also in photographing an intended image without releasing the light shielding state during wide preview display.

Description of Fourth Embodiment

Figure 13:
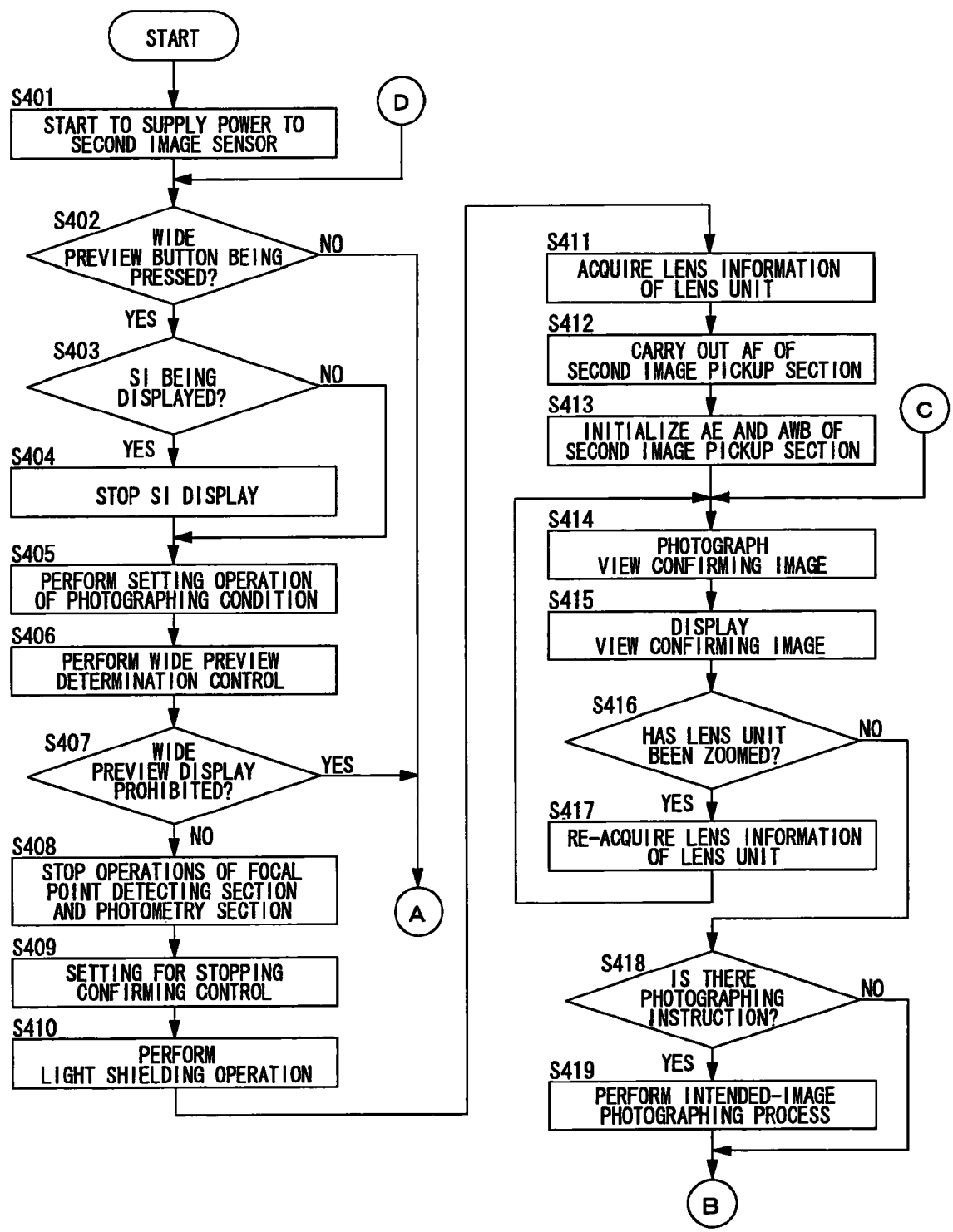
FIG. 13 is a flow chart showing an operation of an electronic camera regarding a wide preview display in a fourth embodiment.
Figure 14:
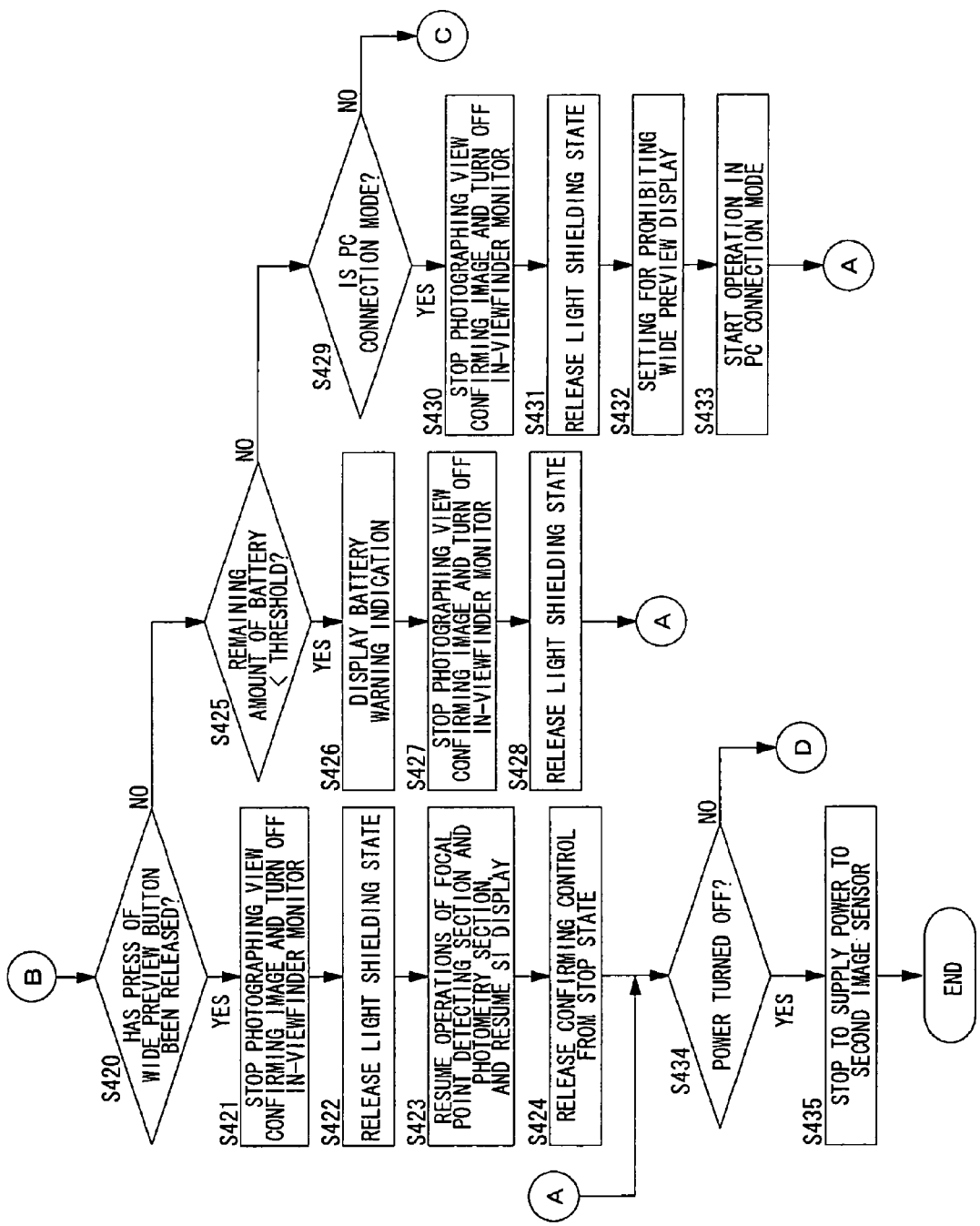
FIG. 14 is a flow chart showing an operation of the electronic camera regarding the wide preview display in the fourth embodiment.

Hereinafter, the operation of an electronic camera regarding the wide preview display in a fourth embodiment is described with reference to flow charts of FIG. 13 and FIG. 14. Here, since the basic configuration of the electronic camera of the fourth embodiment is in common with that of the first embodiment, the duplicated description is omitted. In addition, in the following description, the description will be made assuming that as the operation mode of the electronic camera the photographing mode for photographing an intended image is selected.

Step 401: when a user turns on the power of the camera body 11, the CPU 50 will start to supply power to the second image sensor 30. At the stage of S401, the main mirror 21 is in the observation position. Accordingly, a user can observe from the eyepiece lens 35 a subject image formed by a light flux that passed through the lens unit 12. In addition, FIG. 6 shows a display state of an optical image of a subject in the viewfinder optical system.

Moreover, if a user presses the aperture preview button 48d while the below-described wide preview display is not performed, the CPU 50 will carry out confirming control for narrowing down the aperture 17. Accordingly, the user can observe an optical image in the deepest depth of field by means of the viewfinder optical system, so that the user can confirm the range of the depth of field.

Step 402: the CPU 50 determines whether or not the wide preview button 48c is being pressed. If the wide preview button 48c is being pressed (YES side), the flow moves to S403. On the other hand, if the wide preview button 48c is not being pressed (NO side), the flow moves to S434.

Step 403: the CPU 50 determines whether or not the SI section 27 is carrying out the SI display of an AF area while the wide preview button 48c is pressed. If the SI display is being carried out (YES side), the flow moves to S404. On the other hand, if the SI display is not being carried out (NO side), the flow moves to S405.

Step 404: the CPU 50 instructs the SI section 27 to stop the SI display. This is because an optical image by means of the viewfinder optical system will not be displayed on the wide preview display and thus the SI display is not required.

Step 405: the CPU 50 performs a setting operation of the photographing condition. Specifically, the CPU 50 carries out AF based on an output of the focal point detecting section 25. Moreover, the CPU 50 carries out the AE calculation and AWB calculation based on an output of the photometry section 26. In addition, in S405, the SI display of an AF area by the SI section 27 is not carried out.

Step 406: the CPU 50 performs the wide preview determination control to determine whether or not it is the case where the wide preview display is prohibited.

Specifically, if the case corresponds to either one of the following conditions: (1) when light emission by the flash-emission device is carried out during photographing and (2) when the brightness of field is equal to or less than a threshold, then the CPU 50 turns on the flag for prohibiting the wide preview display.

Moreover, (3) also when the remaining amount of a battery detected by the power supply section 49 is less than a threshold, the CPU 50 turns on the flag for prohibiting the wide preview display. This is because the wide preview display cannot be carried out also when there is no remaining amount of a battery. Moreover, (4) also when operating in a PC connection mode, the CPU 50 turns on the flag for prohibiting the wide preview display.

Step 407: the CPU 50 determines whether or not the flag for prohibiting the wide preview display has been turned on in the wide preview determining control (S406). If the wide preview display is prohibited (YES side), the flow moves to S434. On the other hand, if the wide preview display is allowed (NO side), the flow moves to S408.

Step 408: the CPU 50 stops the operations of the focal point detecting section 25 and photometry section 26 prior to starting the wide preview display. This is because the focal point detecting section 25 and the photometry section 26 will be unable to function by the below-described light shielding operation during wide preview display.

Step 409: the CPU 50 carries out the setting for stopping the confirming control by the aperture preview button 48*d*. This is because the above-described confirming control does not need to be performed since the field can not be observed with a light flux passing through the lens unit 12 during wide preview display.

Step 410: the CPU 50 carries out the light shielding operation to block the incident light from the lens unit 12 onto the viewfinder optical system.

Specifically, the CPU 50 moves the main mirror 21 from the observation position to the retreated position to block the incident light onto the viewfinder optical system. In addition, if the brightness of field is sufficiently low, the CPU 50 may block the incident light onto the viewfinder optical system by narrowing down the aperture 17.

Step 411: the CPU 50 acquires the lens information (the lens positions and the like of the zoom lens 15 and focus lens 16) from the lens unit 12.

Step 412: the CPU 50 carries out the AF of the lens 29 based on the lens position of the focus lens 16 among the lens information in S411. In addition, if the lens 29 is of a pan-focus type and does not have the AF function, the step of S412 is omitted.

Step 413: the CPU 50 initializes the AE and AWB of the second image pickup section 42 based on the photographing condition acquired in S405. In addition, after the start of photographing in the second image pickup section 42, the CPU 50 adjusts the parameters of the AE and AWB of the second image pickup section 42 based on the data of a through image in the second image pickup section 42.

Step 414: the CPU 50 photographs a view confirming image with the second image sensor 30 of the second image pickup section 42. Then, the second image pickup section 42 outputs a data of the view confirming image to the CPU 50.

Step 415: the display processing section 50*c* of the CPU 50 displays the view confirming image on the in-viewfinder monitor 28 (S414). Since the field angle of the lens 29 has a wider angle than the field angle of the lens unit 12 has, the view confirming image can display a subject in a wider range than an optical image of the viewfinder optical system can. Moreover, FIG. 7 shows an example of display of the view confirming image corresponding to the scene of FIG. 6.

Here, a state of the camera body 11 during wide preview display is shown in FIG. 8. Since the incident light from the lens unit 12 onto the viewfinder optical system is blocked by the light shielding operation (S410) during wide preview display, a user can observe only the view confirming image (S414) of the in-viewfinder monitor 28 from the eyepiece lens 35. Accordingly, the user can observe a field by means of a wider-angled view confirming image than an image of the viewfinder optical system without detaching eyes away from the eyepiece lens 35. In addition, FIG. 8 shows an example of the light shielding state in which the main mirror 21 is moved to the retreated position during the light shielding operation.

Moreover, the display processing section 50*c* performs the display processing for indicating the range of field angle of the first image pickup section 41 on the view confirming image. For example, the display processing section 50*c* calculates the range of field angle of the first image pickup section 41 in a view confirming image based on the lens information (S411) and the zoom position data of the lens 29. Then, the display processing section 50*c* displays a frame overlappingly onto a view confirming image in the in-viewfinder monitor 28 by an on-screen function, the frame indicative of the above-described range of field angle (see FIG. 7). In this case, a user can also know the photographing area of the first image pickup section 41 from the view confirming image.

In addition, the CPU 50 in S415 can carry out the zooming of the lens 29 or the electronic zooming of a view confirming image by the display processing section 50*c*, in response to a user's operation of the zoom switch 48*e*.

Step 416: the CPU 50 determines whether or not there is a change in the lens position of the zoom lens 15 of the lens unit 12 (whether the lens unit 12 has been zoomed). If there is a change in the lens position due to the zooming of the lens unit 12 (YES side), the flow moves to S417. On the other hand, if there is no change in the lens position (NO side), the flow moves to S418.

Step 417: the CPU 50 re-acquires the lens information regarding the lens position of the zoom lens 15 from the lens unit 12. Then, the CPU 50 returns to S414 and repeats the above-described operations. In this way, in the display processing in S415, the display processing section 50*c* can display a frame that reflects a change in the field angle due to the zooming of the zoom lens 15.

Step 418: the CPU 50 determines whether or not there is a photographing instruction given by a press of the release button 48*a*. If there is the photographing instruction (YES side), the flow moves to S419. On the other hand, if there is no photographing instruction (NO side), the flow moves to S420.

Step 419: the CPU 50 performs the intended-image photographing process, and photographs an intended image by means of the first image sensor 23 of the first image pickup section 41. Subsequently, the first image pickup section 41 generates an image data of the intended image, and the CPU 50 records the image data of the intended image onto the recording medium 52.

Here, in the intended-image photographing process of S419, the CPU 50 once releases the shielding state caused by the wide preview display and light shielding operation, and operates the focal point detecting section 25 and photometry section 26 to re-set the photographing condition before photographing. Then, the CPU 50 photographs the intended image based on the photographing condition that is re-set immediately before photographing. In this case, the CPU 50 resumes the wide preview display after completion of the photographing.

In addition, the CPU 50 may photograph the intended image based on the photographing condition of S405 without releasing the state of light shielding operation. In this case, the subject can be photographed more quickly because the operation of re-setting the photographing condition can be omitted.

Step 420: the CPU 50 determines whether or not the press of the wide preview button 48*c* has been released. If the press of the wide preview button 48*c* has been released (YES side), the flow moves to S421. On the other hand, if the wide preview button 48*c* is being pressed (NO side), the flow moves to S425.

Step 421: the CPU 50 stops photographing the view confirming image in the second image pickup section 42 and turns off the in-viewfinder monitor 28.

Step 422: the CPU 50 releases the light shielding state caused by the light shielding operation. Accordingly, a user can observe again the subject image from the eyepiece lens 35, the subject image being formed by a light flux that passed through the lens unit 12.

Step 423: the CPU 50 resumes the operations of the focal point detecting section 25 and photometry section 26. Moreover, the CPU 50 instructs the SI section 27 to resume the SI display.

Step 424: the CPU 50 releases the setting (S409) for stopping the confirming control. Accordingly, the CPU 50 can perform the confirming control again in response to a press of the aperture preview button 48*d*. Subsequently, the CPU 50 moves to S434.

Step 425: in this case the CPU 50 determines whether or not the remaining amount of a battery detected by the power supply section 49 is less than a threshold. The threshold in S425 is determined on the basis of the remaining amount of a battery required for continuation of photographing. If the remaining amount of a battery is less than the threshold (YES side), the flow moves to S426. On the other hand, if the remaining amount of a battery is equal to or greater than the threshold (NO side), the flow moves to S429.

Step 426: the CPU 50 displays a battery warning indicator on the in-viewfinder monitor 28, the indicator indicating that the remaining amount of a battery is less than the threshold.

Step 427: the CPU 50 stops photographing the view confirming image in the second image pickup section 42 and turns off the in-viewfinder monitor 28.

Step 428: the CPU 50 releases the light shielding state caused by the light shielding operation. Thus, when the remaining amount of a battery is less than a threshold, the electronic camera will return to the state before the wide preview display. Subsequently, the CPU 50 moves to S434.

Step 429: in this case the CPU 50 determines whether or not the operation mode has been changed from the photographing mode to the PC connection mode. The above-described PC connection mode is an operation mode when the electronic camera is connected to an external apparatus to perform data communication. The CPU 50 detects a change in the above-described operation modes based on the selection operation of the PC connection mode on the mode dial 48*b* or the connection state of the connection terminal of the external I/F 47.

If the operation mode has been changed to the PC connection mode (YES side), the flow moves to S430. On the other hand, if the operation mode remains the photographing mode (NO side), the CPU 50 returns to S414 and continues the wide preview display. In other words, while the wide preview button 48*c* is being pressed, the CPU 50 will continue to display a view confirming image in motion on the in-viewfinder monitor 28 until the remaining amount of a battery has run out or until the mode has been changed to the PC connection mode.

Step 430: the CPU 50 stops photographing the view confirming image in the second image pickup section 42 and turns off the in-viewfinder monitor 28.

Step 431: the CPU 50 releases the light shielding state caused by the light shielding operation. Accordingly, in the PC connection mode, the electronic camera will return to the state before the wide preview display.

Step 432: the CPU 50 carries out the setting for prohibiting the wide preview display. In other words, during the operation in the PC connection mode, the CPU 50 will not perform the wide preview display even if the wide preview button 48*c* is pressed.

Step 433: the CPU 50 starts the operation in the PC connection mode. The CPU 50 in the PC connection mode can control the data communication with an external apparatus from the host's perspective, the external apparatus being connected via the external I/F 47. Here, the above-described external apparatus includes a personal computer, a storage device for recording image data, a printer for printing images, and the like, for example.

For example, in the PC connection mode, the CPU 50 transfers the data of an intended image to the external apparatus, thereby storing the data of the intended image into a recording part of the personal computer or storage device. Moreover, in the PC connection mode, the CPU 50 may also output the data of an intended image to a printer (external apparatus) so that the printer carries out direct printing of the intended image.

Step 434: in this case the CPU 50 determines whether or not there is an operation to turn off the power of the camera body 11. If there is the above-described operation (YES side), the flow moves to S435. On the other hand, if there is no such operation (NO side), the CPU 50 returns to S402 and repeats the above-described operations.

Step 435: the CPU 50 stops to supply power to the second image sensor 30. Now, the description of the operation according to the flow charts of FIG. 13 and FIG. 14 has been completed.

In addition, a case where the PC connection mode is selected during the activation of the camera is described briefly. In this case, the CPU 50 prohibits the wide preview display as in the case of S432 until the PC connection mode is released. In addition, since the content in the PC connection mode in this case is the same as that of the above-described S433, the duplicated description is omitted.

Hereinafter, an effect of the fourth embodiment is described. The electronic camera of the fourth embodiment photographs a view confirming image from an optical path different from that of the first image pickup section 41 by means of the second image pickup section 42 and displays the view confirming image observably from the eyepiece lens 35 by means of the in-viewfinder monitor 28. Thus, depending on the situations, a user can selectively observe an optical image by means of the viewfinder optical system and a view confirming image by means of the second image pickup section 42 without detaching eyes away from the eyepiece lens 35.

Especially when a telescopic lens with a narrow field angle is mounted on the camera body 11, the field of view of an optical image by means of the viewfinder optical system becomes narrow, however, even in this case a user can appropriately know the state of field by the wide-angle view confirming image. Accordingly, even in the case where a moving subject is telescopically photographed, e.g., in photographing sports and the like, a user can track the subject relatively easily, so that the user is less likely to miss a photo opportunity.

Moreover, the CPU 50 in the fourth embodiment stops the operations of the focal point detecting section 25, photometry section 26, SI section 27, and the like during wide preview display and at the same time stops the confirming control of the depth of field by the aperture preview button (S404, S408, and S409). For this reason, during wide preview display, a wasteful power consumption associated with portions that do not function effectively will not occur.

Furthermore, the CPU 50 in the fourth embodiment prohibits the wide preview display when the remaining amount of a battery is less than a threshold or in the case of the PC connection mode (S406, S425, S429, and S432). For this reason, the wide preview display will not be carried out in inappropriate situations. Since power will not be consumed by unnecessary wide preview display especially in the case of the PC connection mode, the effect is significant.

Description of Fifth Embodiment

Figure 15:
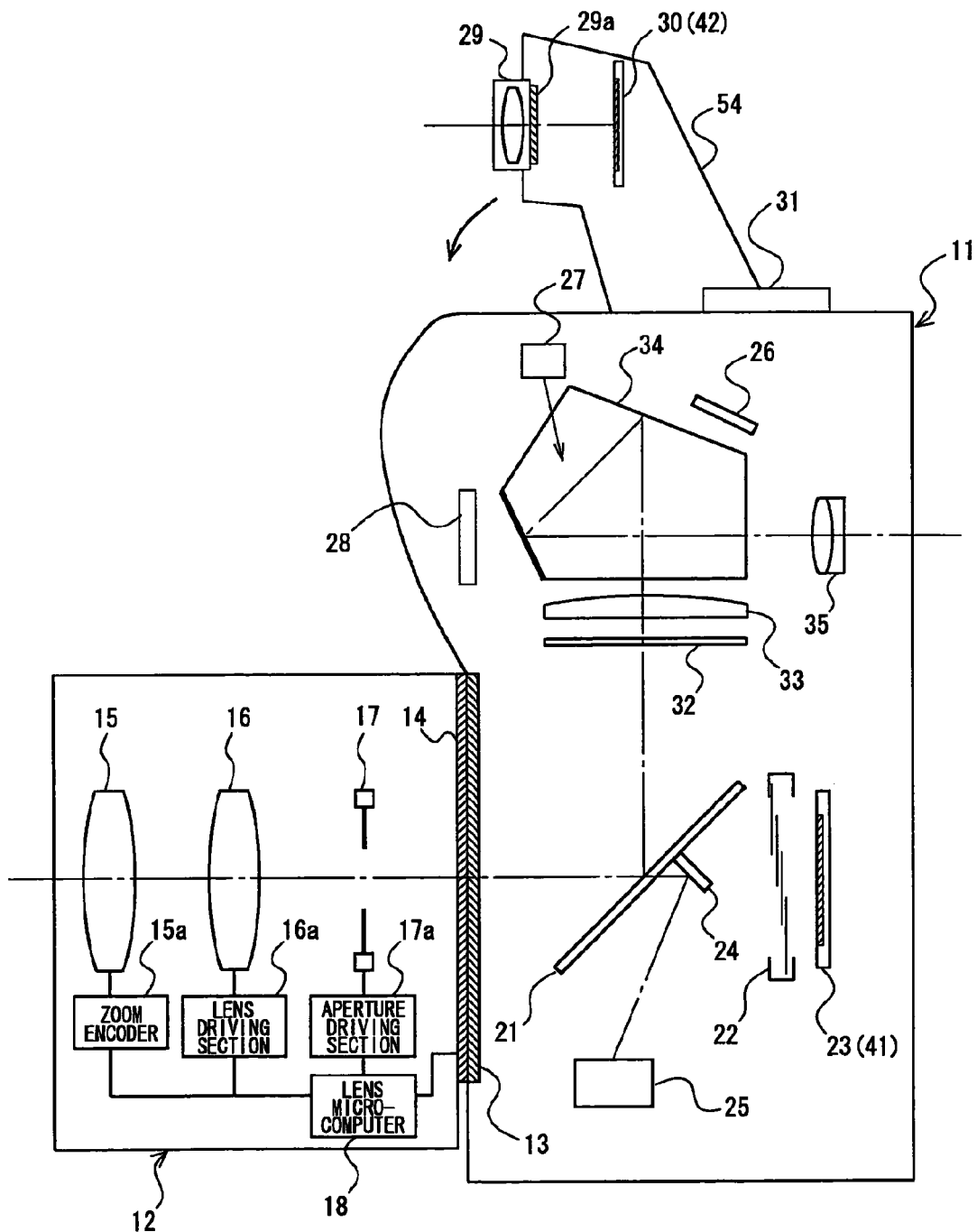
FIG. 15 is an explanatory view of a photographing mechanism of an electronic camera in a fifth embodiment.

FIG. 15 is a view illustrating the photographing mechanism of an electronic camera in a fifth embodiment. Here, in the following description of the embodiments, constituent elements of the camera are in common with those of the first embodiment and are given the same reference numerals to omit the duplicated description.

The fifth embodiment is a variation of the first embodiment to the fourth embodiment, showing an example in which the second image pickup section 42 is attached to a movable member 54 that houses an emitting section 53 used for flash photographing. A base side of the movable member 54 is rotatably supported to the camera body 11 with a rotating shaft (not shown). Then, the movable member 54 can rotate with respect to the camera body 11 to thereby switch between a first position and a second position.

Figure 16:
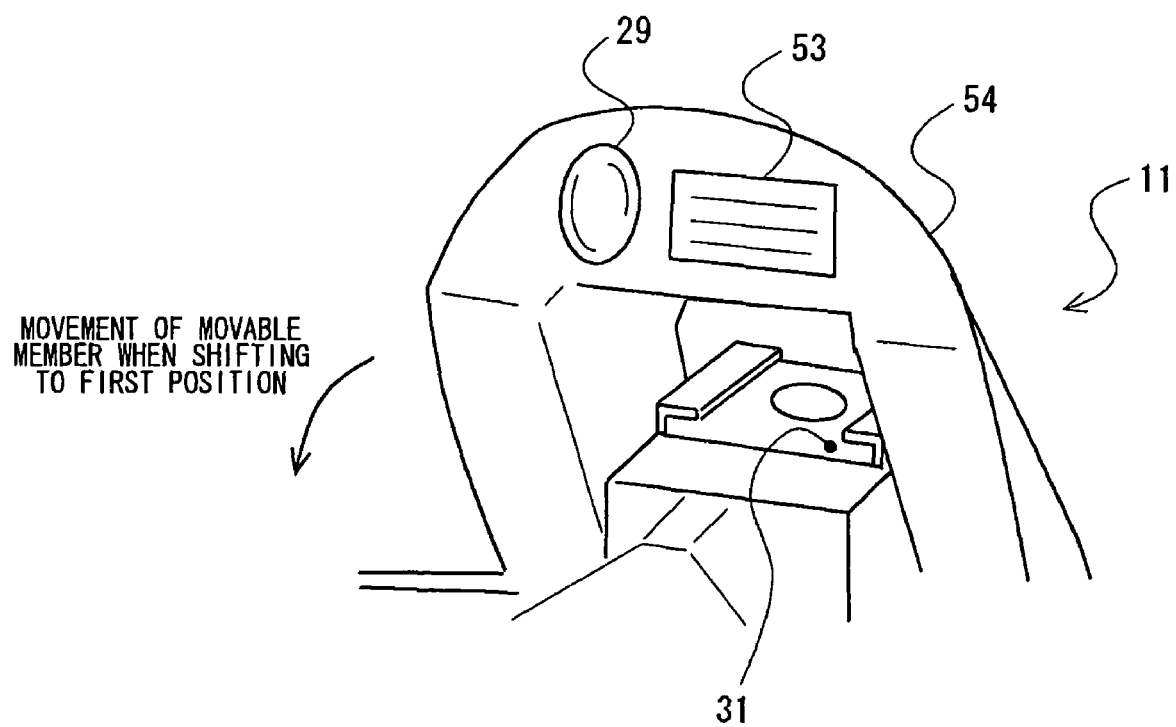
FIG. 16 is a perspective view showing a state where a movable member is in a second position.

When the movable member 54 is in the first position, the movable member 54 is housed in the camera body 11 and the movable member 54 configures a part of the surface of the camera body 11. On the other hand, when the movable member 54 is in the second position, a tip side of the movable member 54, to which the second image pickup section 42 and the emitting section 53 are attached, projects from the camera body 11 (see FIG. 16). Thus, when the movable member 54 is in the second position, the irradiation of a subject with emission of the emitting section 53 and the photographing of a view confirming image by means of the second image pickup section 42 are enabled. Here, the emitting section 53 and the lens 29 of the second image pickup section 42 are disposed side by side on the tip side of the movable member 54.

In the fifth embodiment described above, in addition to substantially the same effect as those of the first embodiment to the fourth embodiment, the photographing position of the second image pickup section 42 can be far away from the optical axis of the lens unit 12. It is therefore possible to reduce the possibility of shading of a view confirming image by a lens-barrel of the lens unit 12, as compared with the cases of the first embodiment to fourth embodiment. Moreover, in the fifth embodiment, because the second image pickup section 42 can be housed in the camera body 11 when not in use by moving the movable member 54, sense of design and functionality of the camera body 11 can be enhanced.

Description of Sixth Embodiment

Figure 17:
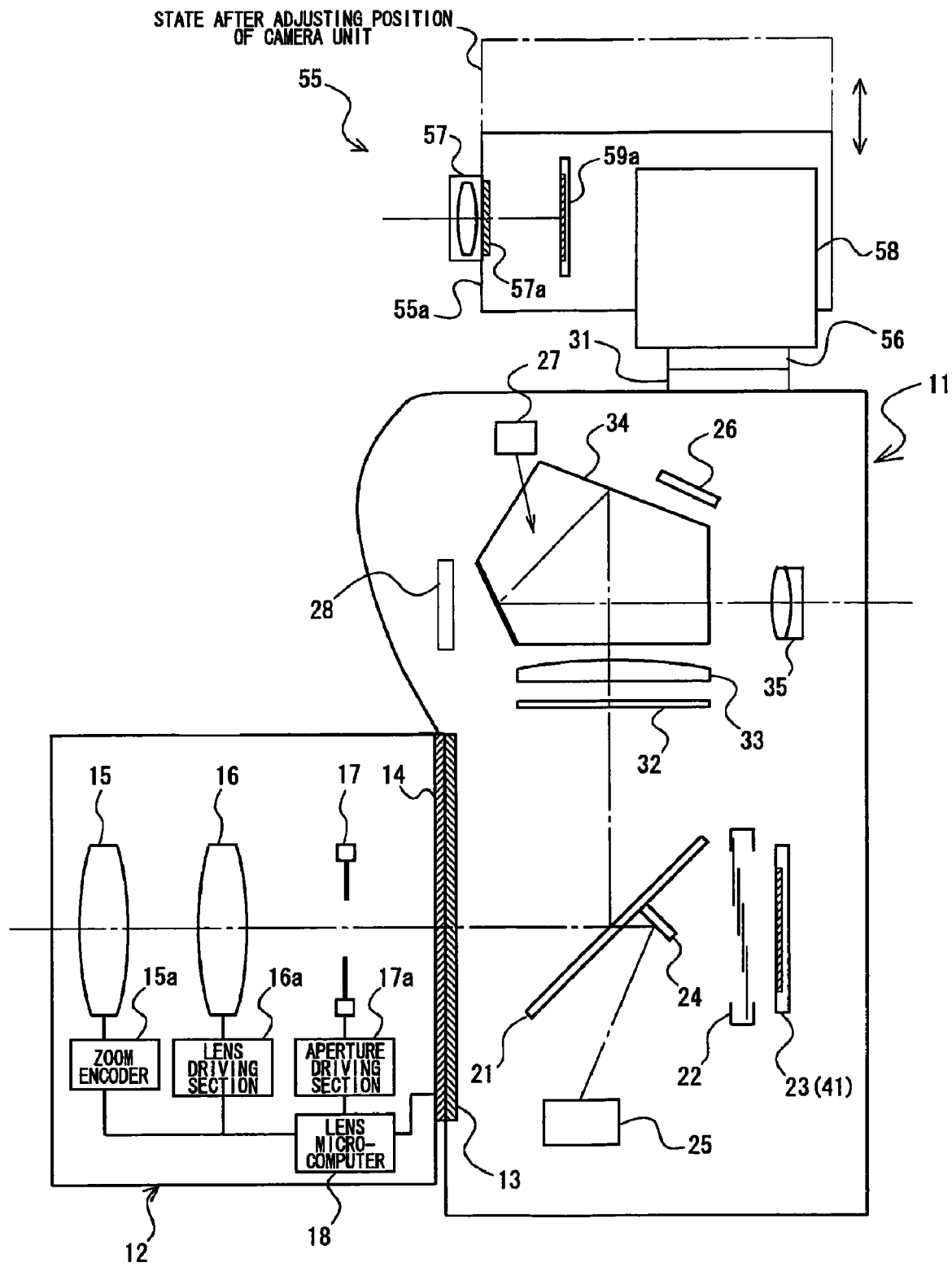
FIG. 17 is an explanatory view of a photographing mechanism of an electronic camera system in a sixth embodiment.
Figure 18:
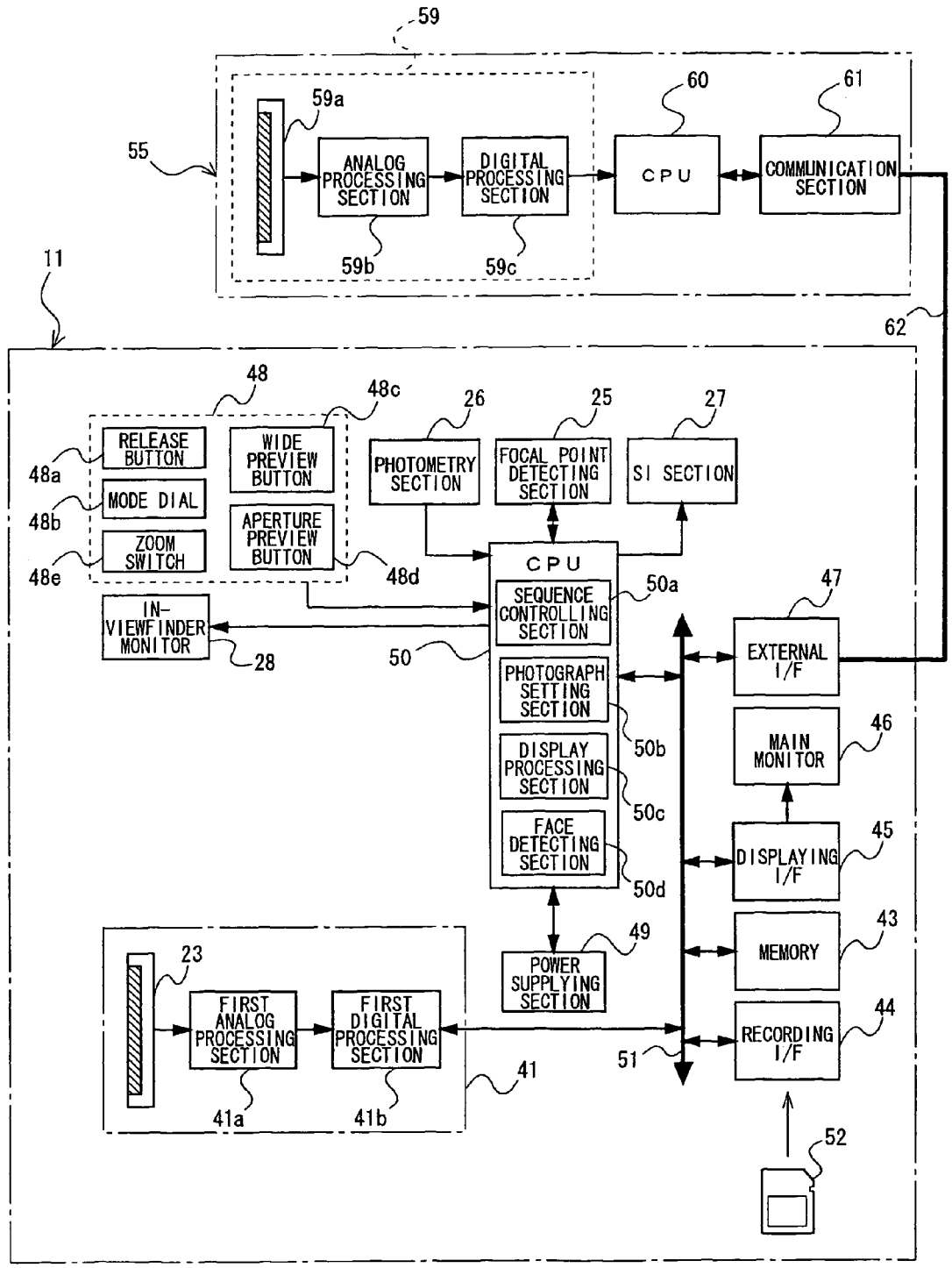
FIG. 18 is a block diagram of the electronic camera system in the sixth embodiment.

FIG. 17 is a view illustrating the photographing mechanism of an electronic camera in a sixth embodiment. Moreover, FIG. 18 is a block diagram of an electronic camera system in the sixth embodiment. The sixth embodiment shows an example in which the camera system is configured by externally attaching a camera unit 55, which photographs a view confirming image, to the camera body 11.

The camera system of the sixth embodiment includes the camera body 11 and the camera unit 55. The camera body 11 in the sixth embodiment has a configuration substantially common with that of the camera body 11 of the first embodiment, except for not including the lens fixing section 29a and the second image pickup section 42. The camera body 11 carries out communication with the camera unit 55 via the external I/F 47. In addition, in the fifth embodiment, the camera unit 55 is mounted in the hot shoe 31 of the camera body 11.

On the other hand, as shown in FIG. 17, the camera unit 55 includes a fixing section 56 for engaging with the hot shoe 31, a lens 57 and a lens fixing section 57a, and a position adjusting section 58. The lens 57 and the lens fixing section 57a are mounted on a body part 55a of the camera unit 55. Moreover, the lens 57 is detachable to the lens fixing section 57a, and various kinds of interchangeable lenses can be attached to the lens fixing section 57a. In addition, the configuration of the above-described lens 57 and lens fixing section 57a is substantially in common with the configuration of the lens 29 and lens fixing section 29a of the first embodiment.

The position adjusting section 58 is a pedestal-shaped member having the fixing section 56 on its bottom face section, and supports the body part 55a of the camera unit 55 slidably in the height direction (vertical direction in the view) of the camera system. The position adjusting section 58 serves for adjusting a distance from the optical axis of the lens 57 of the camera unit 55 to the fixing section 56. Thus, even if the camera unit 55 is attached to the camera body 11 of a different model, the parallax of the camera unit 55 can be adjusted by adjusting the distance between the optical axis of the optical shooting system and the optical axis of the lens 57 by means of the position adjusting section 58, so that the compatibility of the camera unit 55 can be increased. Moreover, due to the adjustment of the position of the optical axis of the lens 57 by a user by means of the position adjusting section 58, it is also possible to prevent the shading of a view confirming image caused by the lens-barrel of the lens unit 12.

Moreover, as shown in FIG. 18, the camera unit 55 includes an image pickup section 59, a CPU 60, and a communication section 61. The image pickup section 59 includes an image sensor 59a, an analog processing section 59b, and a digital processing section 59c. The image sensor 59a photoelectrically converts a subject image formed passing through the lens 57, at predetermined intervals and outputs a through image (view confirming image). The output signal of the image sensor 59a is input to the analog processing section 59b. The analog processing section 59b is an analog front end circuit that includes a CDS circuit, a gain circuit, an analog-to-digital conversion circuit, and the like. The digital processing section 59c performs color interpolation processing and the like of the through image.

The CPU 60 controls each part of the camera unit 55 based on instructions from the camera body 11.

The communication section 61 is connected to the external I/F 47 via a cable 62. The communication section 61 transmits data of a view confirming image to the camera body 11 while receiving an instruction from the camera body 11.

The operation of a wide preview display by the camera system of the sixth embodiment is substantially in common with that in the case of the first embodiment except that the camera unit 55 carries out the operation of the second image pickup section 42, so the detailed description is omitted.

Also with the camera system of the sixth embodiment described above, substantially the same effect as those of the first embodiment to the fourth embodiment can be obtained.

SUPPLEMENTARY NOTES ON EMBODIMENTS

In the above-described embodiments, an example regarding a single lens reflex electronic camera has been mainly described, however, the present invention can be also applied to a film-based camera that photographs an intended image by exposing a subject image onto a film. Moreover, in the above-described embodiments, the lenses 29, 57 for photographing a view confirming image may be non-interchangeable with respect to the camera body 11 or the camera unit 55.

Moreover, in the present invention, the camera and an external apparatus may be coupled to each other via wireless communication. For example, the camera and an external apparatus may carry out data communication by wireless communication compliant with the specification of IEEE 802.11 or by wireless communication using Bluetooth (trademark), or the like.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A camera comprising:
a first image pickup section photographing a recording-purpose image;
a viewfinder optical system including an eyepiece section capable of observing an optical image of a subject with a light flux from a photographing optical path of said first image pickup section;
a second image pickup section photographing a view confirming image from an optical path different from that of said first image pickup section;
a displaying section providing said eyepiece section with said view confirming image;
an operation section accepting from a user a displaying operation to ask for display of said view confirming image;
a controlling section switching, based on an operation of said operation section, between a first state to provide said eyepiece section with said optical image and a second state to provide said eyepiece section with said view confirming image; and
a photograph setting section, when in said second state, adjusting a photographing condition of said recording-purpose image based on an output of said second image pickup section.

2. The camera according to claim 1, wherein
said second image pickup section is configured with an external camera unit capable of mounting and dismounting to the camera body.

3. A camera comprising:
a first image pickup section photographing a recording-purpose image;
a viewfinder optical system including an eyepiece section capable of observing an optical image of a subject with a light flux from a photographing optical path of said first image pickup section;
a second image pickup section photographing a view confirming image from an optical path different from that of said first image pickup section;
a displaying section providing said eyepiece section with said view confirming image;
an operation section accepting from a user a displaying operation to ask for display of said view confirming image;
a controlling section switching, based on an operation of said operation section, between a first state to provide said eyepiece section with said optical image and a second state to provide said eyepiece section with said view confirming image; and
a photograph setting section, when in said second state, driving said first image pickup section before photographing said recording-purpose image and adjusting a photographing condition of said recording-purpose image based on an output of said first image pickup section.

4. A camera comprising:
a first image pickup section photographing a recording-purpose image;
a viewfinder optical system including an eyepiece section capable of observing an optical image of a subject with a light flux from a photographing optical path of said first image pickup section;
a second image pickup section photographing a view confirming image from an optical path different from that of said first image pickup section;
a displaying section providing said eyepiece section with said view confirming image;
a photograph setting section adjusting a photographing condition of said recording-purpose image; and
a controlling section switching between a first state to provide said eyepiece section with said optical image and a second state to provide said eyepiece section with said view confirming image, and stopping an operation of said photograph setting section when in said second state.

5. The camera according to claim 4, further comprising:
a superimposing section displaying an indication regarding said photographing condition overlappingly onto said optical image, wherein
said controlling section stops displaying of said superimposing section when in said second state.

6. The camera according to claim 4, further comprising: an operation section accepting an operation of confirming a range of depth of field from a user, wherein
said controlling section performs confirming control of narrowing down an aperture in response to an input of said operation section, and stops said confirming control when in said second state.

7. The camera according to claim 4, wherein
said second image pickup section is configured with an external camera unit capable of mounting and dismounting to the camera body.

8. A camera comprising:
a first image pickup section photographing a recording-purpose image;
a viewfinder optical system including an eyepiece section capable of observing an optical image of a subject with a light flux from a photographing optical path of said first image pickup section;
a second image pickup section photographing a view confirming image from an optical path different from that of said first image pickup section;
a displaying section providing said eyepiece section with said view confirming image;
a communication section performing communication with an external apparatus; and a controlling section switching between a first state to provide said eyepiece section with said optical image and a second state to provide said eyepiece section with said view confirming image, and prohibiting said second state during communication with said external apparatus.

9. The camera according to claim 8, wherein
said second image pickup section is configured with an external camera unit capable of mounting and dismounting to the camera body.

10. A camera comprising:
a first image pickup section photographing a recording-purpose image;
a viewfinder optical system including an eyepiece section capable of observing an optical image of a subject with a light flux from a photographing optical path of said first image pickup section;
a second image pickup section photographing a view confirming image from an optical path different from that of said first image pickup section;
a displaying section providing said eyepiece section with said view confirming image;
a remaining amount detecting section detecting a remaining amount of a battery; and
a controlling section switching between a first state to provide said eyepiece section with said optical image and a second state to provide said eyepiece section with said view confirming image, and prohibiting said second state when the remaining amount of said battery is equal to or less than a threshold.

11. The camera according to claim 10, wherein
said second image pickup section is configured with an external camera unit capable of mounting and dismounting to the camera body.

\* \* \* \* \*